United States Patent
Kim et al.

(10) Patent No.: US 11,315,553 B2
(45) Date of Patent: Apr. 26, 2022

(54) ELECTRONIC DEVICE AND METHOD FOR PROVIDING OR OBTAINING DATA FOR TRAINING THEREOF

(71) Applicant: Samsung Electronics Co., Ltd., Suwon-si (KR)

(72) Inventors: Sangha Kim, Suwon-si (KR); Sungchan Kim, Suwon-si (KR); Yongchan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 16/577,461

(22) Filed: Sep. 20, 2019

(65) Prior Publication Data

US 2020/0098356 A1    Mar. 26, 2020

(30) Foreign Application Priority Data

Sep. 20, 2018  (KR) ..................... 10-2018-0113234
Feb. 1, 2019   (KR) ..................... 10-2019-0013855

(51) Int. Cl.
*G10L 15/20* (2006.01)
*G10L 15/06* (2013.01)
(Continued)

(52) U.S. Cl.
CPC .............. *G10L 15/20* (2013.01); *G06F 3/048* (2013.01); *G06F 3/167* (2013.01); *G10L 15/063* (2013.01);
(Continued)

(58) Field of Classification Search
CPC ....... G10L 15/20; G10L 15/285; G10L 15/22; G10L 15/063; G06F 3/167; G06F 3/048;
(Continued)

(56) References Cited

U.S. PATENT DOCUMENTS 8,954,335 B2   2/2015   Nakamura et al.
9,153,231 B1  10/2015   Salvador et al.
(Continued)

FOREIGN PATENT DOCUMENTS

EP    3133595 A1 *  2/2017  ............. G10L 15/32
GB    2 323 694 A     9/1998
(Continued)

OTHER PUBLICATIONS

International Search Report dated Dec. 27, 2019, issued in International Application No. PCT/KR2019/012272.
(Continued)

*Primary Examiner* — Mohammad K Islam
(74) *Attorney, Agent, or Firm* — Jefferson IP Law, LLP

(57) ABSTRACT

Methods for providing and obtaining data for training and electronic devices thereof are provided. The method for providing data for training includes obtaining first voice data for a voice uttered by a user at a specific time through a microphone of the electronic device and transmitting the voice recognition result to a second electronic device which obtained second voice data for the voice uttered by the user at the specific time, for use as data for training a voice recognition model. In this case, the voice recognition model may be trained using the data for training and an artificial intelligence algorithm such as deep learning.

20 Claims, 13 Drawing Sheets

(51) Int. Cl.
*G10L 15/28* (2013.01)
*G06F 3/048* (2013.01)
*G10L 15/32* (2013.01)
*G06F 3/16* (2006.01)
*G10L 15/22* (2006.01)

(52) U.S. Cl.
CPC ............ *G10L 15/22* (2013.01); *G10L 15/285* (2013.01); *G10L 15/32* (2013.01)

(58) Field of Classification Search
CPC ................ G06F 1/1643; G06F 3/0412; H04M 1/72533; H04R 1/083; H04R 27/00
See application file for complete search history.

(56) References Cited

U.S. PATENT DOCUMENTS

| | | | |
|---|---|---|---|
| 9,318,107 B1 | 4/2016 | Sharifi | |
| 9,361,885 B2* | 6/2016 | Ganong, III | G10L 15/22 |
| 9,443,527 B1* | 9/2016 | Watanabe | G10L 15/26 |
| 9,779,734 B2* | 10/2017 | Lee | G10L 15/24 |
| 9,805,733 B2* | 10/2017 | Park | G10L 21/00 |
| 9,953,647 B2 | 4/2018 | Mun et al. | |
| 10,134,388 B1* | 11/2018 | Lilly | G10L 15/063 |
| 10,192,557 B2 | 1/2019 | Lee et al. | |
| 10,325,590 B2* | 6/2019 | Deisher | G10L 15/187 |
| 10,365,887 B1* | 7/2019 | Mulherkar | G06F 3/167 |
| 10,643,609 B1* | 5/2020 | Pogue | G10L 25/51 |
| 10,867,596 B2* | 12/2020 | Yoneda | G10L 21/0208 |
| 10,878,826 B2* | 12/2020 | Li | G10L 17/22 |
| 2001/0003173 A1* | 6/2001 | Lim | G10L 15/20 704/239 |
| 2004/0010409 A1 | 1/2004 | Ushida et al. | |
| 2004/0128135 A1* | 7/2004 | Anastasakos | G10L 15/30 704/270.1 |
| 2011/0046952 A1* | 2/2011 | Koshinaka | G10L 15/063 704/243 |
| 2011/0131032 A1* | 6/2011 | Yang | G06F 40/45 704/2 |
| 2012/0059652 A1 | 3/2012 | Adams et al. | |
| 2014/0278372 A1* | 9/2014 | Nakadai | G06F 16/686 704/9 |
| 2014/0303969 A1* | 10/2014 | Inose | G10L 15/22 704/231 |
| 2014/0358535 A1* | 12/2014 | Lee | G10L 17/22 704/233 |
| 2015/0039317 A1* | 2/2015 | Klein | G10L 15/32 704/275 |
| 2015/0058018 A1* | 2/2015 | Georges | G10L 15/08 704/257 |
| 2015/0154002 A1 | 6/2015 | Weinstein et al. | |
| 2015/0161998 A1 | 6/2015 | Park et al. | |
| 2015/0287408 A1 | 10/2015 | Svendsen et al. | |
| 2016/0055850 A1* | 2/2016 | Nakadai | G10L 15/32 704/235 |
| 2016/0140957 A1* | 5/2016 | Duta | G10L 15/063 704/244 |
| 2016/0217795 A1 | 6/2016 | Lee et al. | |
| 2016/0217789 A1* | 7/2016 | Lee | G10L 15/32 |
| 2016/0253995 A1 | 9/2016 | Zhou | |
| 2017/0032244 A1* | 2/2017 | Kurata | G06N 3/084 |
| 2017/0053648 A1* | 2/2017 | Chi | G10L 15/22 |
| 2017/0053650 A1* | 2/2017 | Ogawa | G10L 15/063 |
| 2017/0076720 A1* | 3/2017 | Gopalan | G10L 15/22 |
| 2017/0076726 A1* | 3/2017 | Bae | G10L 15/22 |
| 2017/0103755 A1* | 4/2017 | Jeon | H04L 12/2821 |
| 2017/0110117 A1 | 4/2017 | Chakladar et al. | |
| 2018/0033428 A1 | 2/2018 | Kim et al. | |
| 2018/0182383 A1* | 6/2018 | Kim | G06N 3/0445 |
| 2018/0182397 A1* | 6/2018 | Carbune | G10L 15/22 |
| 2018/0188948 A1* | 7/2018 | Ouyang | G06F 3/0233 |
| 2018/0190280 A1 | 7/2018 | Cui et al. | |
| 2018/0211665 A1* | 7/2018 | Park | G06F 3/167 |
| 2018/0218727 A1* | 8/2018 | Cutler | H04M 7/006 |
| 2019/0081810 A1* | 3/2019 | Jung | G10L 15/30 |
| 2019/0228781 A1 | 7/2019 | Lee et al. | |
| 2019/0295542 A1* | 9/2019 | Huang | G10L 15/30 |
| 2019/0348044 A1* | 11/2019 | Chun | G06N 3/004 |
| 2020/0074990 A1* | 3/2020 | Kim | G10L 17/18 |
| 2020/0105264 A1* | 4/2020 | Jang | G06F 3/0485 |
| 2020/0211539 A1* | 7/2020 | Lee | G10L 21/0208 |
| 2020/0211550 A1* | 7/2020 | Pan | G10L 15/063 |
| 2020/0234709 A1* | 7/2020 | Kunitake | G10L 15/22 |
| 2020/0265838 A1* | 8/2020 | Lee | G06F 1/3287 |

FOREIGN PATENT DOCUMENTS

| | | |
|---|---|---|
| JP | 4581441 B2 | 11/2010 |
| KR | 10-2016-0055162 A | 5/2016 |

OTHER PUBLICATIONS

Written Opinion dated Dec. 27, 2019, issued in International Application No. PCT/KR2019/012272.
European Search Report dated Jun. 4, 2021; European Appln. No. 19862044.5-1210 / 3785258 PCT/KR2019012272.

* cited by examiner

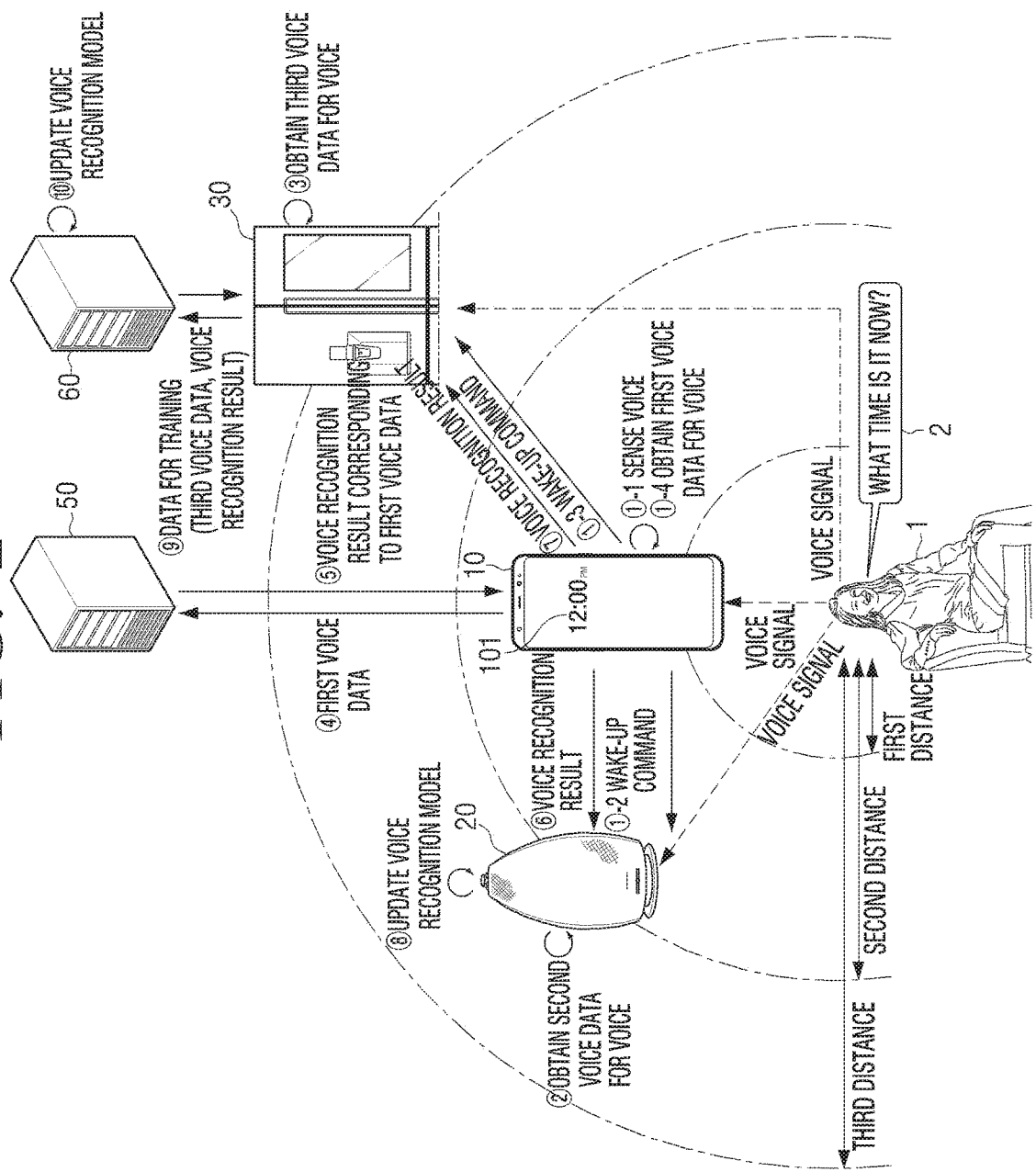

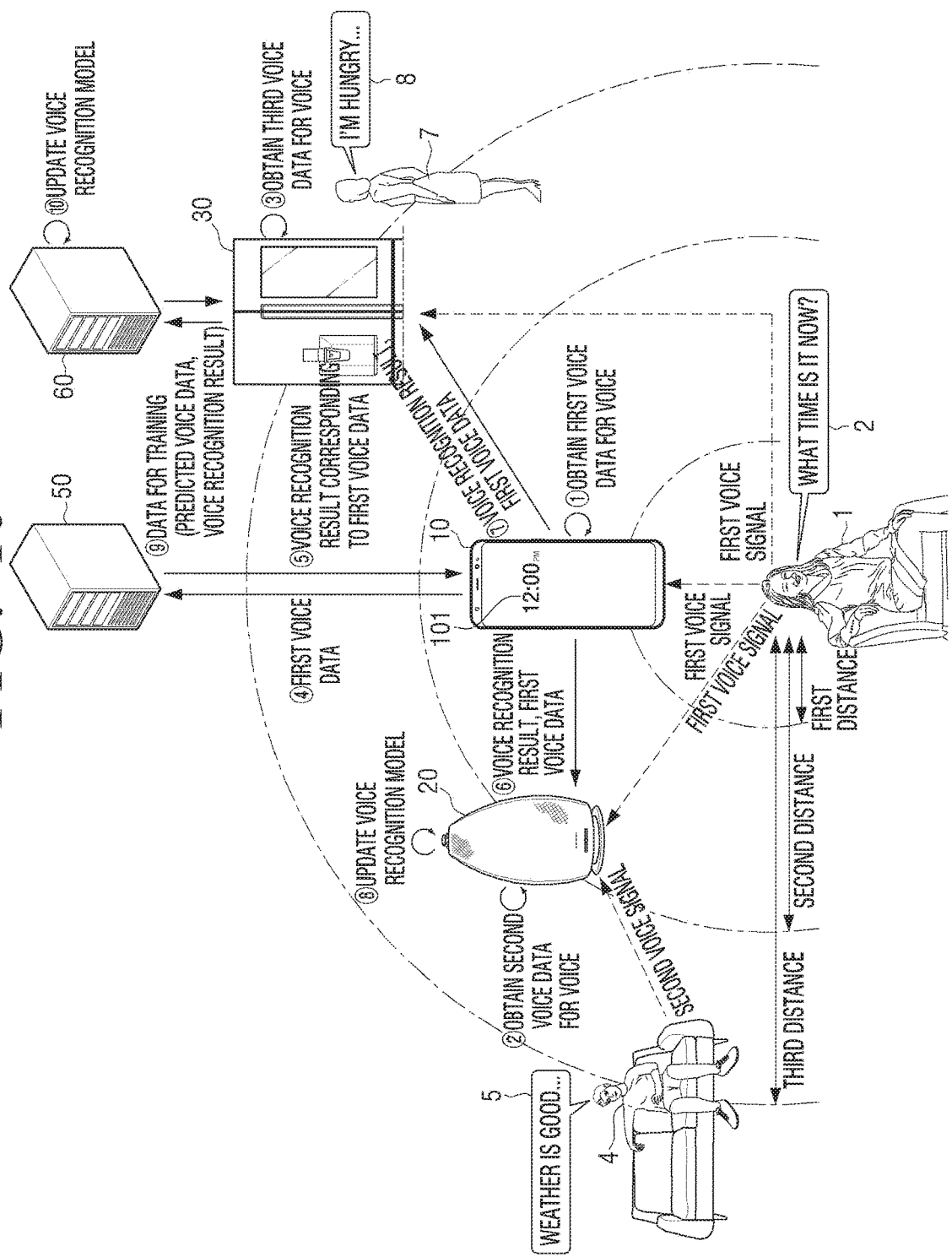

ELECTRONIC DEVICE AND METHOD FOR PROVIDING OR OBTAINING DATA FOR TRAINING THEREOF

CROSS-REFERENCE TO RELATED APPLICATION(S)

This application is based on and claims priority under 35 U.S.C. § 119(a) of a Korean patent application numbers 10-2018-0113234, filed on Sep. 20, 2018, and 10-2019-0013855, filed on Feb. 1, 2019, in the Korean Intellectual Property Office, the disclosure of each of which is incorporated by reference herein in its entirety.

BACKGROUND

1. Field

The disclosure relates to an electronic device and an operation method thereof. More particularly, the disclosure relates to a method for providing or obtaining data for training.

2. Description of the Related Art

There has been a research to improve accuracy of voice recognition. In particular, research on an acoustic model and a language model forming a voice recognition model has been actively developed. The acoustic model and the language model may be updated by training. In this case, accurate data for training for a correct answer may be required to improve voice recognition.

The speech recognition engine may be implemented as a neural network model using an artificial intelligence (AI) algorithm. An artificial intelligence (AI) system is a computer system which realizes a human-level intelligence that the machine learns, judges, and becomes smart, unlike the existing rule and statistics-based smart system. As the use of AI systems improves, a recognition rate and understanding or anticipation of a user's taste may be performed more accurately. As such, existing rule-based smart systems are gradually being replaced by deep learning-based AI systems.

AI technology is composed of machine learning (deep learning) and elementary technologies which utilizes machine learning. Machine learning is an algorithm technology that is capable of classifying or learning characteristics of input data. Element technology is a technology that simulates functions such as recognition and judgment of a human brain using machine learning algorithms such as deep learning. Machine learning is composed of technical fields such as linguistic understanding, visual understanding, reasoning, prediction, knowledge representation, motion control, or the like.

Examples of various fields in which AI technology is applied are as identified below. Linguistic understanding is a technology for recognizing, applying, and/or processing human language or characters and includes natural language processing, machine translation, dialogue system, question and answer, voice recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge-based and probability-based inference, optimization prediction, preference-based planning, recommendation, or the like. Knowledge representation is a technology for automating human experience information into knowledge data, including knowledge building (data generation or classification), knowledge management (data utilization), or the like. Motion control is a technique for controlling the autonomous running of the vehicle and the motion of the robot, including motion control (navigation, collision, driving), operation control (behavior control), or the like.

The above information is presented as background information only to assist with an understanding of the disclosure. No determination has been made, and no assertion is made, as to whether any of the above might be applicable as prior art with regard to the disclosure.

SUMMARY

A speech recognition model for recognizing speech that is input via an electronic device may generally be generated using data for training collected in an optimal environment. For example, a speech recognition model may be trained using data for training collected in an optimal experimental environment where soundproofing is good or is not interrupted by an obstacle.

However, there may be a variety of variables in the environment using the actual speech recognition model. For example, an environment in which a user utters a voice toward an electronic device may be noisy, and a user may utter a voice from a far distance towards the electronic device. Alternatively, there may be an obstacle between the user and the electronic device.

In this case, a speech recognition model trained in an optimal environment may not provide optimal performance in an actual speech utterance environment. Accordingly, there is a need to update the speech recognition model to take into account the actual utterance environment, and thus, optimal data for training that takes into account the actual utterance environment may be required to train the speech recognition model.

If there are a plurality of electronic devices that may respond to a user's utterance, data for training may be required for each speech recognition model in order to train the speech recognition models used by the plurality of electronic devices. Accordingly, a method of using data for training that may be representative to quickly and effectively update the respective speech recognition models may be required.

Aspects of the disclosure are to address at least the above-mentioned problems and/or disadvantages and to provide at least the advantages described below. Additional aspects will be set forth in part in the description which follows and, in part, will be apparent from the description, or may be learned by practice of the presented embodiments.

In accordance with an aspect of the disclosure, a method for providing data for training by a first electronic device is provided. The method includes obtaining first voice data for a voice uttered by a user at a specific time through a microphone of the first electronic device, obtaining a voice recognition result corresponding to the first voice data, and transmitting the voice recognition result, to a second electronic device which obtained second voice data for the voice uttered by the user at the specific time, for use as data for training a voice recognition model.

In accordance with another aspect of the disclosure, a method for obtaining data for training by a second electronic device is provided. The method includes obtaining second voice data for a voice uttered by a user at a specific time through a microphone of the second electronic device, receiving a voice recognition result corresponding to first voice data from a first electronic device which obtained the first voice data for the voice uttered by the user at the specific time, and using the second voice data and the voice recognition result corresponding to the first voice data, as data for training a voice recognition model.

In accordance with yet another aspect of the disclosure, a first electronic device is provided. The first electronic device includes a microphone configured to receive a voice uttered by a user, a communicator configured to communicate with a second electronic device, at least one processor configured to execute at least one instruction, a memory configured to store the at least one instruction. The at least one processor, based on the at least one instruction being executed, may obtain first voice data for the voice uttered by the user at a specific time through the microphone, obtain a voice recognition result corresponding to the first voice data, and transmit the voice recognition result, to the second electronic device which obtained a second voice data fort the voice uttered by the user at the specific time, for use as data for training a voice recognition model.

In accordance with yet another aspect of the disclosure, a second electronic device is provided. The second electronic device includes a microphone configured to receive a voice uttered by a user, a communicator configured to communicate with a first electronic device, at least one processor configured to execute at least one instruction, and a memory configured to store the at least one instruction. The at least one processor, based on the at least one instruction being executed, may obtain second voice data for the voice uttered by the user at a specific time through the microphone, receive, from the first electronic device which obtained first voice data for the voice uttered by the user at the specific time, a voice recognition result corresponding to the first voice data through the communicator, and use the second voice data and the voice recognition result corresponding to the first voice data, as data for training a voice recognition model.

The computer program product according to the disclosure may include a non-transitory computer readable storage medium including instructions, which based on the instructions being executed by at least one processor of a first electronic device, causes the first electronic device to perform obtaining first voice data of a voice uttered by a user at a specific time through a microphone of the first electronic device, obtaining a voice recognition result corresponding to the first voice data, and transmitting the voice recognition result, to the second electronic device which obtained the second voice data for the voice uttered by the user at the specific time, for use as data for training a voice recognition model.

The computer program product according to the disclosure includes a non-transitory computer readable storage medium including instructions, which based on the instructions being executed by at least one processor of a second electronic device, causes the second electronic device to perform obtaining second voice data of a voice uttered by a user at a specific time through a microphone of the second electronic device, receiving a voice recognition result corresponding to the first voice data from the first electronic device which obtained the first voice data for the voice uttered by the user at the specific time, and using the second voice data and the voice recognition result corresponding to the first voice data, as data for training a voice recognition result.

According to the disclosure, a correct answer (for example, a voice recognition result) corresponding to a voice uttered by a user may be obtained using an electronic device (for example, a first electronic device) used as a representative. In this case, it is possible to efficiently update (or train) the voice recognition model used by another electronic device (for example, the second electronic device) by using the voice data for the user voice and the voice recognition result of the user voice as data for training. In addition, the data for training may be used to train voice recognition models used by each of a plurality of other electronic devices (for example, the second electronic device and the third electronic device) together.

In addition, a place (for example, on a sofa, or the like.) where user utterance frequently occurs may be determined to some extent. In this case, an electronic device (for example, the first electronic device) located closest to the user may recognize the user voice more accurately and obtain a correct voice recognition result corresponding thereto, than other electronic devices (for example, the second electronic device or the third electronic device) located at a long distance.

In this case, if an electronic device located near a user shares the voice recognition result obtained by the user with other electronic devices remotely located, the remotely located other electronic devices may obtain a correct voice recognition result corresponding to the voice recognized from the far distance. If the other electronic devices use the voice recognition result as data for training, the speech recognition model that each of the other electronic devices uses may be effectively trained.

In addition, various effects that are grasped directly or indirectly may be provided through the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 2 and 3 are views of a system according to another embodiment of the disclosure;

FIG. 10 is a view illustrating a system in a situation where there are a plurality of speakers according to an embodiment of the disclosure.

Throughout the drawings, like reference numerals will be understood to refer to like parts, components, and structures.

DETAILED DESCRIPTION

Figure 1A:
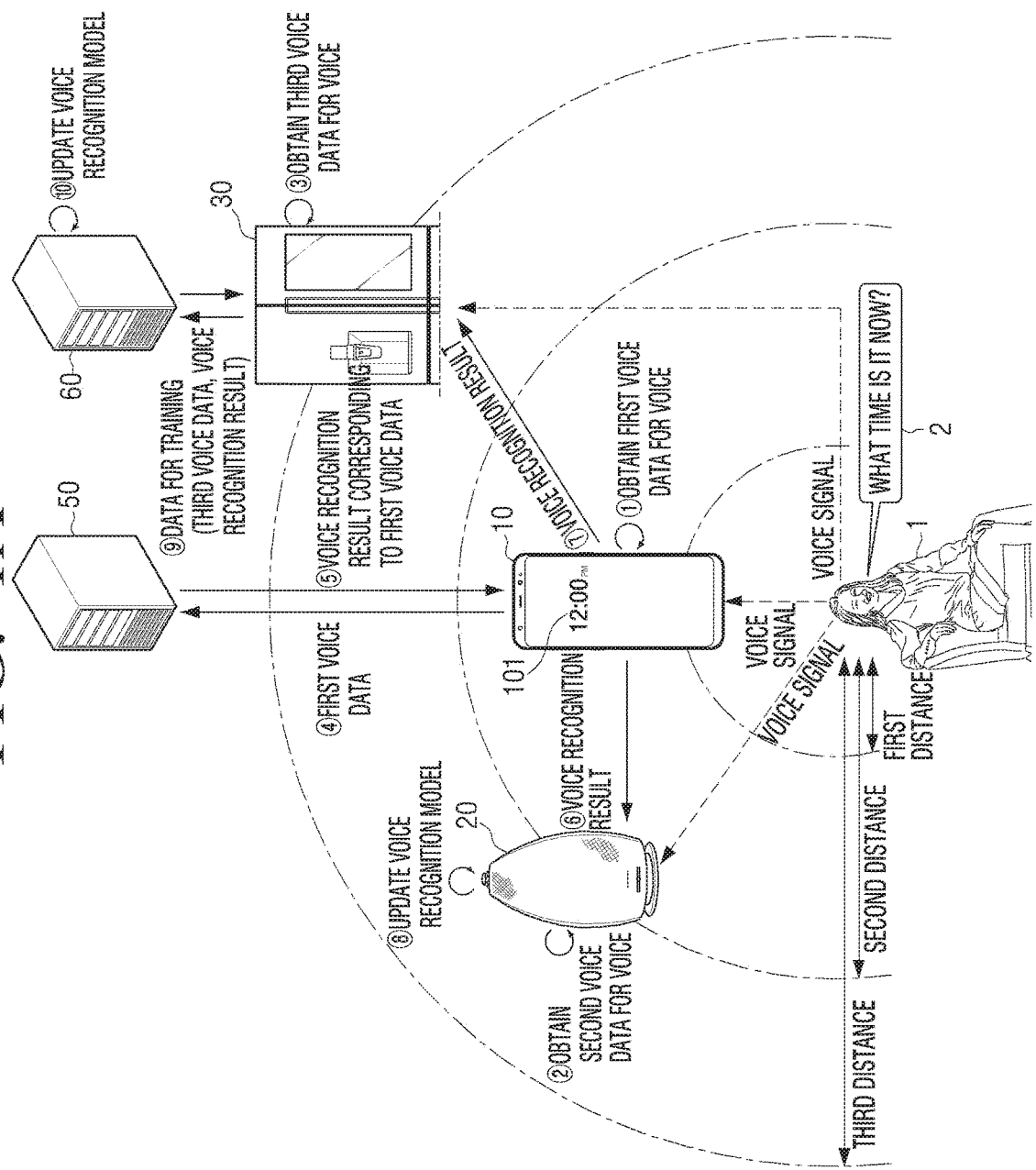
FIG. 1A is a view of a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used herein may be used to describe various elements, but the elements should not be limited by the terms. The terms are only used to distinguish one element from another.

The term such as "first" and "second" used in various embodiments may modify various elements, but does not limit the corresponding elements. For example, the term does not limit an order and/or importance of the corresponding elements. The term may be used to distinguish one element from another.

For example, a first element may be referred to as a second element, and, similarly, a second element may be referred to as a first element, without departing from the scope of the various embodiments of the disclosure.

In the specification, when a part is "connected to" another part, it is not only the case where a part is "directly connected", but also is "electrically connected" to the other element by interposing another element therebetween. Further, it should be noted that any portion is "connected" to another portion includes where some portion is in a state capable of performing data communication via signal transmission and reception with another portion.

Some embodiments of the disclosure may be represented by functional block configurations and various processing steps. Some or all of these functional blocks may be implemented in various numbers of hardware and/or software configurations that perform particular functions. For example, the functional blocks of the disclosure can be implemented by one or more microprocessors, or can be implemented by circuit configurations for a given function. Also, for example, the functional blocks of the disclosure can be implemented in various programming or scripting languages. The functional blocks can be implemented as an algorithm executed in one or more processors. In addition, the disclosure can employ techniques for electronic environment setting, signal processing, and/or data processing. The terms "element," "means," and "configuration" can be used broadly, and are not limited to mechanical and physical configurations.

In addition, the connection lines or connecting members between the components shown in the drawings are functional connections and/or physical or circuit connections. In an actual device, connection among elements may be represented by various functional connection, physical connection, or circuitry connection which are added or may be replaced.

In the embodiment, the term "speaker" may mean a person that uttered any speech, and the term "listener" may refer to a person who hears the uttered speech. In the conversation of a plurality of people, a speaker and a listener change from moment to moment and there may be confusion in distinguishing each person as the speaker and the listener. Thus, in the disclosure, based on the language used by each person, the person who uses the first language may be referred to as "the first speaker" and the person who uses the second language may be referred to as "the second speaker."

The term "text" in the embodiments described in this disclosure may refer to data that aims to convey the meaning to the other party. A "text" may include data in a natural language format such as a character, a symbol, a word, a phrase, a sentence, a diagram, a chart, or the like, data in a form of an artificial language character arrangements, or audio data. For example, "text" may mean that speech uttered by a speaker is represented as text or voice data.

Any of the instances of the term "voice recognition" in present disclosure may be substituted with the term "speech recognition" such that any aspect of the disclosure described with reference to voice recognition may equally be applicable to speech recognition. In addition, any aspect of the disclosure described with reference to voice recognition may equally be applicable to a combination of voice recognition and speech recognition. Further, any of the instances of the term "speech recognition" in present disclosure may be substituted with the term "voice recognition" such that any aspect of the disclosure described with reference to speech recognition may equally be applicable to voice recognition. Also, any aspect of the disclosure described with reference to speech recognition may equally be applicable to a combination of speech recognition and voice recognition.

Hereinafter, the disclosure will be further described with reference to the drawings.

FIG. 1A is a view of a system according to an embodiment of the disclosure.

A system 1 of FIG. 1A may include a first electronic device 10, a second electronic device 20, a third electronic device 30, a first server 50, and a second server 60.

The first to third electronic devices 10-30, for example, an electronic device in accordance with various embodiments of the disclosure, may include at least one of, for example, smartphones, tablet PCs, mobile phones, video telephones, electronic book readers, desktop PCs, laptop PCs, netbook computers, workstations, servers, a personal digital assistant (PDA), a portable multimedia player (PMP), an MP3 player, a medical device, a camera, or a wearable device. A wearable device may include at least one of the accessory type (e.g., a watch, a ring, a bracelet, a bracelet, a necklace, a pair of glasses, a contact lens or a head-mounted-device (HMD)); a fabric or a garment-embedded type (e.g., an electronic clothing); a body-attached type (e.g., a skin pad or a tattoo); or a bio-implantable circuit. In some embodiments, the electronic device may include at least one of, for example, a television, a digital video disk (DVD) player, audio, refrigerator, cleaner, ovens, microwaves, washing machines, air purifiers, set top boxes, home automation control panels, security control panels, media box (e.g.: Samsung HomeSync™, Apple TV™, or Google TV™), game consoles (e.g., Xbox™, PlayStation™), electronic dictionary, electronic key, camcorder, or electronic frame.

In other embodiments, the electronic device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), a photographing device, or ultrasonic wave device, etc.), navigation system, global navigation satellite system (GNSS), event data recorder (EDR), flight data recorder (FDR), automotive infotainment devices, marine electronic equipment (e.g., marine navigation devices, gyro compasses, etc.), avionics, security devices, car head units, industrial or domestic robots, drone, automated teller machine (ATM)s of financial institutions, points of sale of stores, or Internet of Things (IoT) devices (e.g., light bulbs, sensors, sprinkler devices, fire alarms, thermostats, street lights, toasters, exercise equipment, hot water tanks, heater, boiler, etc.).

In another embodiment, the electronic device may include at least one of a furniture, a building/structure or a portion of a vehicle, an electronic board, an electronic signature receiving device, a projector, or various metrology instruments (e.g., water, electricity, gas, or radio wave measuring equipment, or the like). The electronic device according to an embodiment of the disclosure is not limited to the aforementioned devices. In this disclosure, the term user may refer to a person who uses an electronic device or a device (example: artificial intelligence electronic device) that uses an electronic device.

Referring to FIG. 1A, a user 1 (or a speaker) is illustrated. The user 1 may utter a voice at a specific time (e.g., at specific time or during specific time). For example, the user 1 may utter voice 2, "what time is it now?". In this case, the first electronic device 10 located at a first distance (e.g., short distance) from the user 1 may obtain first voice data for the voice 2 uttered by the user 1 at the specific time through a microphone provided in the first electronic device 10 (①). The first voice data may be, for example, a digital signal obtained by converting the voice that is an analog signal uttered by the user 1 through a converter. At this time, the second electronic device 20 located at a second distance (e.g., middle distance) from the user 1 may also obtain second voice data for the voice 2 uttered by the user 1 at the specific time through a microphone provided in the second electronic device 20 (②). In addition, the third electronic device 30 located at a third distance (e.g., long distance) from the user 1 may also obtain the third voice data for the voice 2 uttered by the user 1 at the specific time through a microphone provided in the third electronic device 30 (③).

In this case, the first voice data, the second voice data, and the third voice data may be different from each other. For example, specification of microphones provided in the first electronic device 10, the second electronic device 20, and the third electronic device 30 are different from each other and thus, the voice data may be different from each other. In addition, the location of each of the first electronic device 10, the second electronic device 20, and the third electronic device 30 may be different from each other. For example, in FIG. 1A, the position at which the second electronic device 20 obtains the voice 2 is farther than the position where the first electronic device 10 obtains the voice 2, and thus, when compared with the first voice data, the second voice data obtained by the second electronic device 20 may include time difference or phase difference, less amplitude, or more noise. Similarly, the location at which the third electronic device 30 obtains the voice 2 may be farther than the location where the second electronic device 20 obtains the voice 2, when compared with the first voice data, the third voice data obtained by the third electronic device 30 may include more time difference or phase difference, less amplitude, or more noise.

Referring to FIG. 1A, when the first electronic device 10 obtains the first voice data, the first electronic device 10 may obtain a voice recognition result corresponding to the obtained first voice data. For example, the first electronic device 10 may apply the voice recognition result corresponding to the obtained first voice data to the speech recognition model provided in the first electronic device 10 and obtain the voice recognition result. Alternatively, the first electronic device 10 may transmit the first voice data to the first server 50 that may communicate with the first electronic device 10 (④). The first electronic device 10 may obtain the voice recognition result corresponding to the first voice data from the first server 50 (⑤).

To be specific, the first electronic device 10 may, by applying the obtained first voice data to the first electronic device 10 or the voice recognition model provided in the first server 50, obtain text data as a result of the voice recognition result. The acoustic model may include information related to vocalization, and the language model may include information on unit phoneme information and a combination of unit phoneme information. The voice recognition module may convert the utterance of the user 1 into text data using the information related to the vocalization and information on the unit phoneme.

As another example, the first electronic device 10 may apply the obtained first voice data to the voice recognition model and the natural language understanding module provided in the first electronic device 10 or the first server 50 and obtain the user's intension as the voice recognition result.

As an embodiment, the natural language understanding module may recognize the intention of a user by performing syntactic analysis or semantic analysis. Grammatical analysis may divide the user input in grammatical units (e.g., words, phrases, morphemes, or the like), and may grasp which grammatical elements the divided units may have. The semantic analysis may be performed using semantic matching, rule matching, formula matching, or the like. Accordingly, the natural language understanding module may acquire domain, intent, or parameter (or slot) for expressing the intent by the user input.

As another embodiment, the natural language understanding module may determine user intention and parameters using the matching rule divided into a domain, an intention, and a parameter (or a slot) for grasping the intention. For example, the one domain (e.g., an alarm) may include a plurality of intents (e.g., alarm setting, alarm cancellation, or the like), and one intention may include a plurality of parameters (e.g., time, repetition times, alarm sound, or the like). The plurality of rules may include, for example, one or more mandatory element parameters. The matching rule may be stored in a natural language understanding database (NLU DB).

As a still another embodiment, the natural language understanding module may grasp the meaning of a word extracted from a user input using a linguistic characteristic (e.g., a grammatical element) such as a morpheme or a phrase, and determine a user intention by matching the grasped meaning with the domain and the intention. For example, the natural language understanding module may determine the user's intention by calculating how many words extracted from user input are included in each domain and intention. According to one embodiment, the natural language understanding module may determine the parameters of the user input using words that become a basis for understanding the intent. According to one embodiment, the natural language understanding module may determine the user's intention using the natural language recognition database in which the linguistic characteristic for grasping the intention of the user input is stored.

As still another embodiment, the natural language module may determine a user's intention using a personal language model (PLM). For example, the natural language understanding module may determine the user's intention using personalized information (e.g., contact list, music list). The personalized language model may be stored in, for example, natural language recognition database.

As another embodiment, the first electronic device 10 may apply the obtained first voice data to the voice recognition model and the natural language understanding module provided in the first electronic device 10 or the first server 50, and obtain a path rule as the voice recognition result.

As an embodiment, the natural language understanding module may generate a path rule based on the intent and a parameter of a user input. For example, the natural language understanding module may select an application to be executed based on the intention of a user input, and determine an action to be performed in the selected application. The natural language understanding module may generate the path rule by determining a parameter corresponding to the determined action. According to one embodiment, the path rule generated by the natural language understanding module may include an application to be executed, an action (e.g., at least one state) to be executed in the application, and information about parameters for executing the action.

As another embodiment, the natural language understanding module may generate one path rule or a plurality of path rules based on the intention and parameter of the user input. For example, the natural language understanding module may receive a path rule set corresponding to the first electronic device 10 from a pass planner module, and determine the path rule by mapping the intention and the parameter of the user input to the received path rule set.

As still another embodiment, the natural language understanding module may generate one or a plurality of path rules by determining an application to be executed based on the intention and parameter of the user input, an action to be executed in an application, and a parameter for executing the action. For example, the natural language understanding module may generate the path rule by arranging the application to be executed or the action to be executed by the application in an ontology or graph model according to the intention of the user input using the information of the first electronic device 10.

As still another embodiment, the natural language understanding module may select at least one path rule from among a plurality of generated path rules. For example, the natural language understanding module may select an optimal path rule from among the plurality of path rules. For example, the natural language understanding module may select a plurality of path rules when only some actions are specified based on user utterance. The natural language understanding module may determine one path rule among the plurality of path rules by an additional input of the user.

The first electronic device 10 may display voice recognition information 101 associated with the voice recognition result corresponding to the obtained first voice data on a screen. The first electronic device 10 may transmit the voice recognition result (e.g., text data, user's intention or path rule) corresponding to the obtained first voice data to the second electronic device 20 located at the second distance which is relatively farther than the location of the first electronic device 10 from the user 1 (⑥). In addition, the first electronic device 10 may transmit the obtained voice recognition result to the third electronic device 30 located at the third distance which is farther than the location of the second electronic device 20 from the user 1 (⑦).

The second electronic device 20 or the third electronic device 30 that obtains the voice recognition result corresponding to the first voice data associated with the voice 2 uttered by the user 1 may use the voice recognition result as a part of the data for training (or learning label, similar correct answer, or the like) for training of the voice recognition model.

The second electronic device 20 may form the second voice data for the voice uttered by the user 1 obtained in operation ② and the voice recognition result corresponding to the first voice data received in operation ⑥ into a set and use it as data for training. For example, when the voice recognition model is located in the second electronic device 20, the second electronic device 20 may update the voice recognition model by applying the {second voice data, voice recognition result obtained from the first electronic device 10} as the data for training to the voice recognition model (⑧).

The third electronic device 30 may form the third voice data for the voice uttered by the user 1 obtained in operation ③ and the voice recognition result corresponding to the first voice data obtained in operation ⑦ into a set and use it as data for training. For example, when the voice recognition model is located in the second server 60, the third electronic device 30 may transmit {third voice data, voice recognition result obtained from the first electronic device 10} as the data for training to the second server 60 where the voice recognition model is located (⑨). The second server 60 may apply the received data for training to the voice recognition model and update the voice recognition model stored in the second server 60 (⑩).

According to the disclosure, the second electronic device 20 or the third electronic device 30 may use the voice data obtained by the second electronic device 20 or the third electronic device 30, and the voice recognition result obtained by the first electronic device 10 as the data for training. In this case, the second electronic device 20 or the third electronic device 30 may determine whether the voice data and the voice recognition result are suitable to be used as the data for learning, and if it is determined that the data is suitable for data for training, may use the voice data and the voice recognition result as the data for training.

For example, in a situation where the voice uttered by the user 1 is a voice related to one function (e.g., a call function, a camera function, or the like) of the first electronic device 10, the second electronic device 20 may obtain the voice data regarding the voice through a microphone provided in the second electronic device 20, and obtain the voice recognition result corresponding to the voice from the first electronic device 10. In this case, if the second electronic device 20 does not support the function, the second electronic device 20 may ignore the voice data and the voice recognition result corresponding to the voice without using them as the data for training. For this purpose, the first electronic device 10 may also transmit information on the target function (or target application) using the voice recognition result to the second electronic device 20 together with the voice recognition result corresponding to the voice. The second electronic device 20 may determine whether the second electronic device 20 supports information about a target function, and if it is determined that the second electronic device 20 does not support the function, the second electronic device 20 may ignore the voice data regarding the voice and the voice recognition result corresponding to the voice without using them as data for training.

The second electronic device 20 or the second server 60 may train the learning network model (or data recognition model) using the aforementioned data for training according to, for example, supervised learning method or unsupervised learning method based on AI algorithm. The learning network model may be, for example, a model based on neural network. The learning network model may include a plurality of network nodes having a weight. In the deep learning model, a plurality of network nodes is located at different depths (or layers), and may transmit and receive data according to a convolution connection relationship. Examples of learned determination models include, but are not limited to, Deep Neural Network (DNN), Recurrent Neural Network (RNN), and Bidirectional Recurrent Deep Neural Network (BRDNN).

The data learning module provided in the second server 60 or the second electronic device 20 which trains the data for training may be implemented as software modules or at least one hardware chip form. The data learning module may be manufactured in the form of an exclusive-use hardware chip for AI, or a general purpose processor (e.g., a CPU or an application processor) or a graphics-only processor (e.g., a GPU) and may be mounted on various electronic devices described above. Herein, the exclusive-use hardware chip for AI may be a dedicated processor for probability calculation, and may have a higher parallel processing performance than related art general purpose processors, so it may quickly process computational tasks in AI such as machine learning.

As an embodiment, when there is a plurality of preconstructed learning network models, the data learning module may determine the learning network model having a large relevance with the input data for training as the learning network model to be trained.

As an embodiment, the data learning module may also train the learning network model using, for example, a learning algorithm including an error back-propagation method or a gradient descent.

As an embodiment, the data learning module may train, for example, the learning network model through the supervised learning with data for training as an input value. Alternatively, the data learning module, by learning by itself without a specific supervision, may train the learning network model through unsupervised learning to detect criterion. The data learning module may train the learning network model through reinforcement learning using, for example, feedback on whether the result of learning is correct.

As an embodiment, when there is a basic learning network model which is pre-trained in the second electronic device 20 or the second server 60, the second electronic device 20 or the second server 60 may update the basic learning network model using the aforementioned learning data. Accordingly, the learning network model which is optimized and adapted to the environment where the second electronic device 20 is located is generated, and thus, the voice recognition result of the second electronic device 20 may be significantly improved.

Figure 1B:
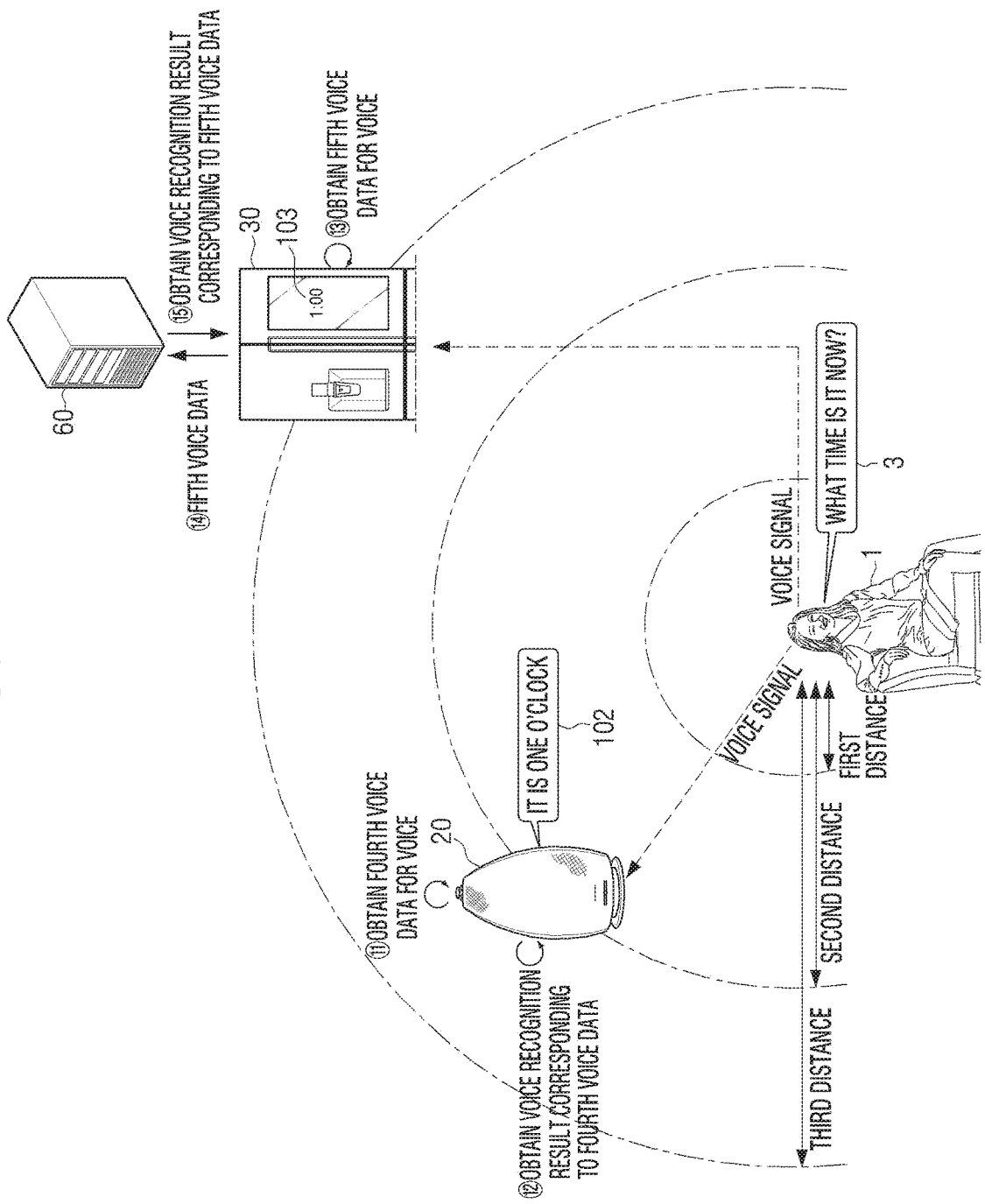
FIG. 1B is a view of a system in a situation not considering a first electronic device according to an embodiment of the disclosure.

FIG. 1B is a view of a system in a situation not considering the first electronic device 10 according to an embodiment of the disclosure.

Referring to FIG. 1B, the voice recognition model used by the second electronic device 20 may be the voice recognition model which is updated using {the second voice data, voice recognition result obtained from the first electronic device 10} as the data for training, as described above, and the voice recognition model used by the third electronic device 30 may be the voice recognition model which is updated using {the third voice data, voice recognition result obtained from the first electronic device 10} as the data for training as described in FIG. 1A.

Referring to FIG. 1B, the user 1 may utter voice 3 at the time different from the specific time when the voice 2 is uttered. The voice 3, for example, may have the same or similar pronunciation, phoneme, meaning, or the like, as the voice 2. For example, if the voice 2 of the specific time is "what time is it now?", the voice 3 uttered at the different times may be, for example, "what time is it now?", "what time now?", "what time?", or the like. As an embodiment, after a trigger voice (e.g., "refrigerator," "speaker," "Bixby," or the like) for activating a voice recognition function of at least one of the second electronic device 20 and the third electronic device 30 is uttered, the voice 3 may be uttered.

As an embodiment, when the second electronic device 20 is triggered in response to the voice 3 of the user 1, the second electronic device 20 may obtain fourth voice data with respect to the voice 3 uttered through a microphone (⑪). When the fourth voice data is obtained, the second electronic device 20 may apply the fourth voice data to the voice recognition model updated in operation ⑧ and obtain the voice recognition result corresponding to the voice 3 (⑫). The second electronic device 20 may output voice recognition information 102 related to the obtained voice recognition result. For example, the voice recognition information 102 may be "the time is ~o'clock" as a reply to the uttered voice 3.

As another embodiment, when the third electronic device 30 is triggered in response to the voice 3 of the user 1, the third electronic device 30 may obtain fifth voice data with respect to the voice 3 uttered through the microphone (⑬). The third electronic device 30 may transmit the obtained fifth voice data to the second server 60 that may communicate with the third electronic device 30 (⑭). The third electronic device 30 may obtain the voice recognition result corresponding to the fifth voice data from the second server 60 (⑮). The third electronic device 30 may display the voice recognition information 103 related to the obtained voice recognition result on a screen.

Accordingly, in general, the second electronic device 20 or the third electronic device 30 located far from the user 1 has a problem that it is difficult to accurately recognize the voice uttered by the user 1, but according to the disclosure, the voice recognition model may be trained using the accurate voice recognition result together with the voice of the user 1 at the far distance, so that the second electronic device 20 or the third electronic device 30 may provide an accurate voice recognition result even for the voice uttered by the user 1 at a far distance.

FIG. 2 is a view of a system according to another embodiment of the disclosure.

Referring to FIG. 2, the first electronic device 10, the second electronic device 20, the third electronic device 30, the first server 50, and the second server 60 respectively correspond to the first electronic device 10, the second electronic device 20, the third electronic device 30, the first server 50, and the second server 60 of FIGS. 1A and 1B, and will not be further described.

Referring to FIG. 2, when the user 1 utters the voice 2, the first electronic device 10 may sense the voice 2 uttered by the user 1 at the specific time using a microphone provided in the first electronic device 10 (①-1). When the voice 2 is sensed, the first electronic device 10 may transmit a wake-up command to control to obtain the voice data for the voice 2 to the second electronic device 20 and the third electronic device 30 (①-2, ①-3).

The first electronic device 10 may obtain the first voice data for the voice 2 (①-4), obtain the voice recognition result corresponding to the first voice data, and transmit the voice recognition result to the second electronic device 20 and the third electronic device 30 (⑥, ⑦).

In the meantime, the second electronic device 20 which received the wake-up command may obtain the second voice data for the voice 2 (②), and the third electronic device 30 which received the wake-up command may obtain the third voice data for the voice 2 (③). For example, when the wake-up command is received during the operation in a low power mode, the second electronic device 20 or the third electronic device 30 may operate in a normal mode, turn on the microphone, and obtain the second voice data and the third voice data for the voice 2, respectively.

When the voice recognition corresponding to the first voice data is received from the first electronic device 10, the second electronic device 20 may update the voice recognition model using the second voice data for the voice 2 and the received voice recognition result as the data for training, and the third electronic device 30 may update the voice recognition model using the third voice data for the voice 2 and the voice recognition result received from the first electronic device 10 as the data for training. The operation ⑧ to operation ⑩ correspond to operations ⑧ to ⑩ of FIG. 1A, and duplicate description will be omitted.

Figure 3:
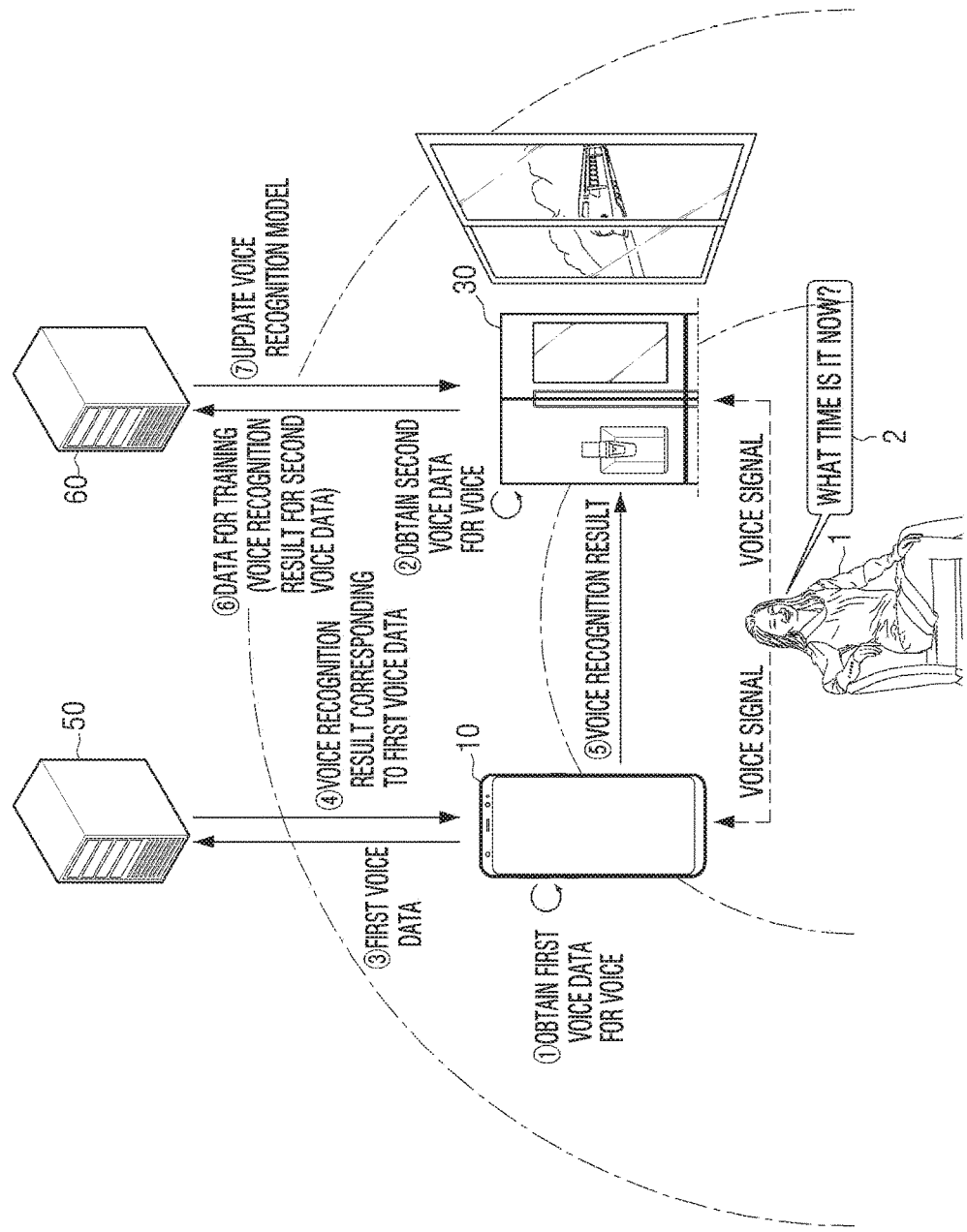

FIG. 3 is a view of a system according to another embodiment of the disclosure.

Referring to FIG. 3, the first electronic device 10, the second electronic device 20, the third electronic device 30, the first server 50, and the second server 60 of FIG. 3 respectively correspond to the first electronic device 10, the second electronic device 20, the third electronic device 30, the first server 50, and the second server 60 of FIGS. 1A and 1B, respectively, and duplicate description will be omitted. At this time, a situation in which the first electronic device 10, the second electronic device 20, and the third electronic device 30 are located may be different from FIGS. 1A, 1B, and 2.

Referring to FIG. 3, the first electronic device 10 and the second electronic device 20 may be at the same or similar distance from the user 1, unlike FIGS. 1A, 1B, and 2. However, a peripheral environment of the first electronic device 10 and the second electronic device 20 may be different from each other. For example, the first electronic device 10 may be located in the inside in a room, and the second electronic device 20 may be located nearby a window. In this case, ambient noise at the second electronic device 20 may be higher than the ambient noise at the first electronic device 10 due to noise (for example, traffic noise, or the like) from the outside of the window.

In this case, the ambient noise at the first electronic device 10 is relatively low and thus the first electronic device 10 may obtain the first voice data for the voice 2 (①), transmit the first voice data to the first server 50 (③), and obtain the voice recognition result corresponding to the voice 2 (④). The first electronic device 10 may transmit the obtained voice recognition result to the second electronic device 20 at which the ambient noise is relatively higher (⑤).

The second electronic device 20 having relatively higher ambient noise may obtain the second voice data for the voice 2 when the user 1 utters voice (②), and obtain the voice recognition result corresponding to the voice 2 from the first electronic device 10 (⑤). The second electronic device 20 may transmit the obtained second voice data and the voice recognition result obtained from the first electronic device 10 as the data for training to the second server (⑥), and control so that the second server 60 may update the voice recognition model using the received data for training (⑦).

Accordingly, the second server 60 may be able to train the voice recognition model using the accurate voice recognition result even for the voice 2 received in an environment with high ambient noise. When the user 1 utters voice in a situation where the first electronic device 10 not present, the second electronic device 20 located in an environment with high ambient noise may be able to provide the voice recognition result corresponding to the voice uttered by the user 1 using the updated voice recognition model.

Figure 4:
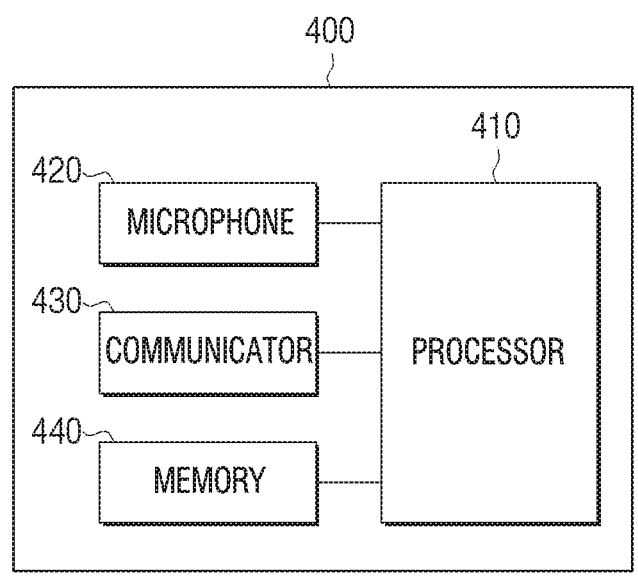
FIG. 4 is a block diagram illustrating a configuration of an electronic device according to an embodiment of the disclosure.

FIG. 4 is a block diagram illustrating a configuration of an electronic device according to an embodiment of the disclosure.

Referring to FIG. 4, an electronic device 400 may be any one of the first electronic device 10, the second electronic device 20, and the third electronic device 30 as described in FIGS. 1A, 1B, 2, and 3.

The electronic device 400 may include a processor 410, a microphone 420, a communicator 430, and a memory 440. However, the electronic device 400 may be implemented by more components than those illustrated in FIG. 4. For example, the electronic device 400 according to an embodiment may be included in at least one of a home appliance, a mobile computing device, and a server, or may be connected to at least one of the home appliance, a mobile computing device, and a server wirelessly or by wire. Detailed examples of the processor 410, the microphone 420, the communicator 430, and the memory 440 may correspond to a processor 920, an audio module 970, a communication module 990, and a memory 930 of FIG. 9, respectively.

The mic (or microphone) 420 may directly receive voice of the user 1 (or speaker). The microphone 420 may receive voice of the user 1 and provide the processor 410 with the voice data associated with the voice of the user 1.

The processor 410 may execute a program stored in the memory 440 and control at least one other component (e.g., hardware or software component) of the electronic device 400 connected to the processor 410.

In one embodiment, the processor 410 may obtain the first voice data for the voice uttered by the user 1 at a specific time through the microphone 420. In addition, when the voice uttered by the user 1 is detected, the processor 410 may transmit a wakeup command to control the second electronic device 20 to obtain second voice data about the voice through the communicator 430.

The processor 410 may obtain a voice recognition result corresponding to the obtained first voice data. For example, the processor 410 may transmit the obtained first voice data to an external voice recognition server through the communicator 430. In response to the transmission of the first voice data, the processor 410 may transmit, through the communicator 430, the voice recognition result to the second electronic device that has acquired the second voice data for the voice uttered by the user 1 at the specific time so that the second electronic device may use the voice recognition result as data for training the voice recognition model.

As an embodiment, the processor 410 may transmit time information related to voice to the second electronic device. The time information related to voice may include, for example, at least one of a time when the processor 410 recognizes a start of the voice or a time when the processor 410 recognizes an end of the voice.

Figure 5:
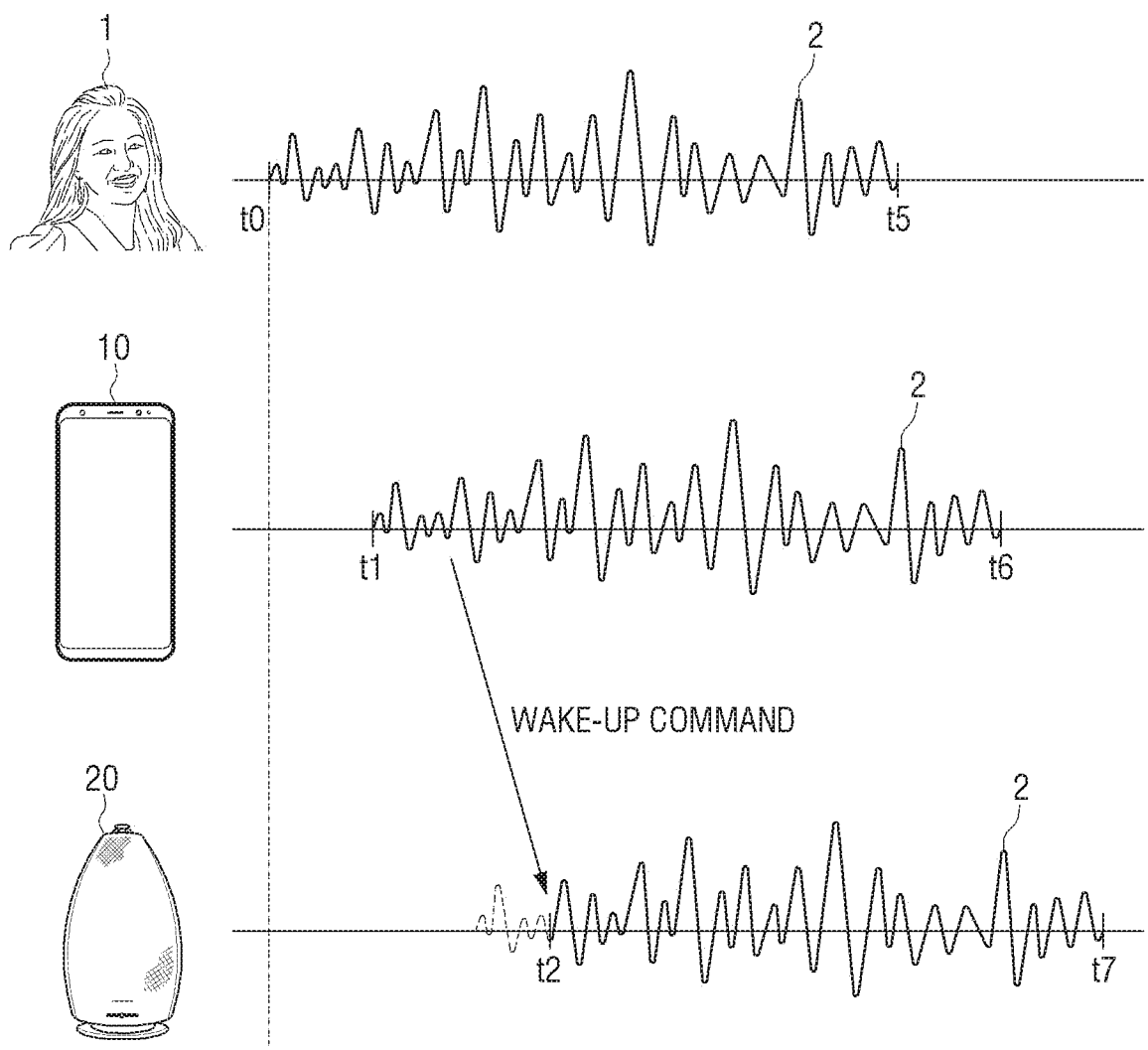
FIG. 5 is a view illustrating a voice input to a first electronic device and a second electronic device according to an embodiment of the disclosure.

FIG. 5 is a view illustrating a voice input to a first electronic device and a second electronic device according to an embodiment of the disclosure.

Specifically, referring to FIG. 5, the user 1 may start utterance of the voice 2 at time t0 and end the utterance of the voice 2 at time t5. In this case, as shown in FIG. 5, there may be a difference between the time when the voice signal arrives at the first electronic device 10 located at a short distance from the user 1 and the time when the voice signal arrives at the second electronic device 20 located at a long distance from the user 1.

For example, the first electronic device 10 may recognize the start of the voice 2 of the user 1 at a time t1, and may recognize the end of the voice 2 of the user 1 at a time t6. The first electronic device 10 that recognizes the voice 2 of the user 1 at a time t1 may transmit a wake-up command of the microphone of the second electronic device 20 to the second electronic device 20 located far from the user 1. The second electronic device 20 that receives the wake-up command may recognize the start of the voice 2 of the user 1 from time t2, and recognize the end of the voice 2 of the user 1 at time t7.

In this case, since the voice recognition result provided by the first electronic device 10 to the second electronic device 20 corresponds to voices from time t1 to time t6, there may be difference with the voices which the second electronic device 20 recognize from time t2 to time t7. Accordingly, the first electronic device 10 may transmit the time information related to the voice corresponding to the voice recognition result and the time information on which the wake-up command is transmitted to the second electronic device 20 together with the voice recognition result.

The second electronic device 20 may correct the second voice data obtained by the second electronic device 20, wherein the second voice data to be used as data for training, using at least one of the voice recognition result, time information related to the voice, and time information at which the wake-up command is transmitted. For example, the second electronic device 20 may restore the missing second voice data according to delayed time of the voice due to difference in distance, voice recognition after receiving the wake-up command to correspond to the voice recognition result.

As another example, the second electronic device 20 may extract only a portion corresponding to the second voice data obtained by the second electronic device 20 among the voice recognition result received from the first electronic device 10. The extracted voice recognition result and the second speech data may be used as data for training. Specifically, the voice recognized by the first electronic device 10 may be "Annyeonghaseyo", and the voice recognized by the second electronic device 20 may be "Haseyo" recognized after receiving the wake-up command. In this case, the second electronic device 20 may extract only a portion corresponding to "Haseyo" from the voice recognition result received from the first electronic device 10 and use the portion as data for training.

When the corrected second voice data is obtained, the second electronic device 20 may use the corrected second voice data and the voice recognition result corresponding to the first voice data obtained from the first electronic device 10 as data for training the voice recognition model.

In one embodiment, the processor 410 may obtain, through the microphone 420, second voice data regarding the voice uttered by the user 1 at a specific time. For example, the processor 410 may receive a wake-up command for obtaining the second voice data from the first electronic device 10 through the communicator. In response to the wake-up command, the processor 410 may obtain the second voice data regarding the voice uttered by the user at a specific time through the microphone 420.

The processor 410 may receive, from the first electronic device which acquires the first voice data for the voice uttered by the user 1 at the specific time, the voice recognition result corresponding to the first voice data through the communicator 430.

The processor 410 may use the second voice data and the voice recognition result corresponding to the first voice data as data for training the voice recognition model.

In addition, the processor 410 may receive time information related to voice from the first electronic device 10 through the communicator 430. In this case, the processor 410 may correct the obtained second voice data by using time information related to the voice. In addition, the processor 410 may use the corrected second voice data and a voice recognition result corresponding to the first voice data as data for training the voice recognition model.

In addition, when the voice recognition model is updated using the second voice data and the voice recognition result corresponding to the first voice data, the processor 410 may obtain third voice data associated with voice data which a user newly utters at a different time than the specific time, through the microphone 420. The processor 410 may obtain the voice recognition result corresponding to the third voice data by applying the obtained third voice data to the updated voice recognition model using the data for training.

In addition, when the first voice data regarding the voice uttered by the user at a specific time is obtained, the processor 410 of the first electronic device 10 may transmit the obtained first voice data to the second electronic device 20 through the communicator 430. While the third voice data for the voice uttered by the user and another user is being obtained, the processor 410 of the second electronic device 20 may obtain predicted voice data for the voice of the user from the third voice data using the obtained first voice data, and use the predicted voice data and the voice recognition result corresponding to the first voice data as data for training the voice recognition model.

Figure 6:
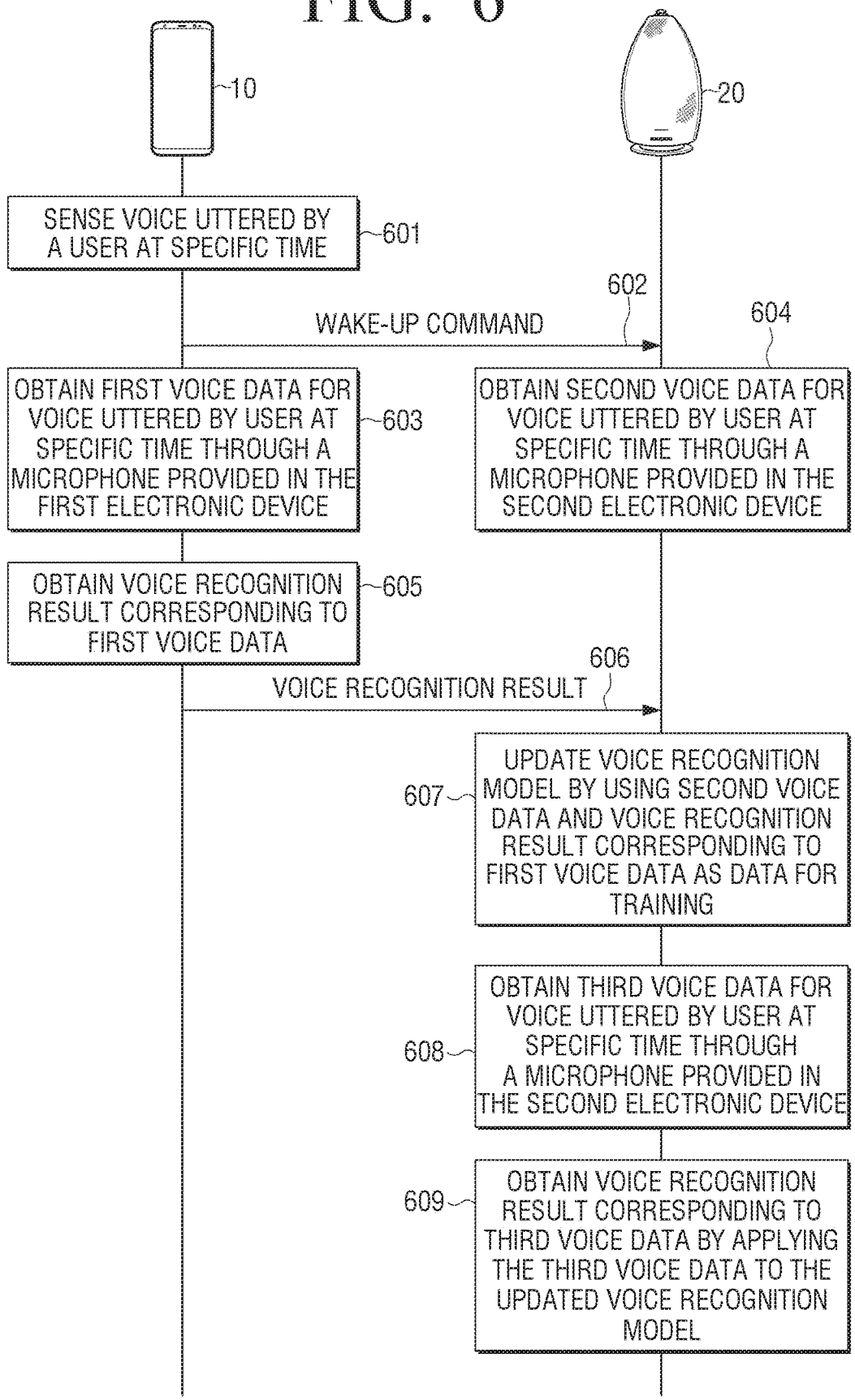
FIG. 6 is a flowchart between a first electronic device and a second electronic device according to an embodiment of the disclosure.

FIG. 6 is a flowchart between a first electronic device and a second electronic device according to an embodiment of the disclosure.

Referring to FIG. 6, the first electronic device 10 may sense a voice uttered by a user at a specific time at operation 601. As the voice is sensed, the first electronic device 10 may transmit a wake-up command to the second electronic device 20 to control the second electronic device 20 to obtain second voice data for the voice at operation 602. In addition, as the voice is sensed, the first electronic device 10 may obtain first voice data of the voice uttered by the user at the specific time through the microphone provided in the first electronic device 10 at operation 603. The first electronic device 10 may obtain a voice recognition result corresponding to the obtained first voice data at operation 605. For example, the first electronic device 10 may apply the first voice data to a voice recognition model provided in the first electronic device 10 to obtain a voice recognition result. Alternatively, the first electronic device 10 may obtain the voice recognition result by applying the first voice data to the voice recognition model provided in the external server. The first electronic device 10 may transmit the obtained voice recognition result to the second electronic device 20 at operation 606.

The second electronic device 20 that has received the wake-up command may obtain the second voice data for the voice uttered by the user at the specific time through the microphone provided in the second electronic device 20 at operation 604. The second electronic device 20 may update the voice recognition model used by the second electronic device 20 by using the obtained second voice data and the voice recognition result corresponding to the first voice data as data for training at operation 607. For example, the second electronic device 20 may update the voice recognition model by applying the data for training to the voice recognition model provided in the second electronic device 20. Alternatively, the second electronic device 20 may update the voice recognition model by applying the data for training to a voice recognition model provided in an external server.

The second electronic device 20 may obtain third voice data regarding the voice uttered by the user at a specific time different from the specific time through the microphone provided in the second electronic device 20 at operation 608. In this case, the second electronic device 20 may obtain a voice recognition result corresponding to the third speech data by applying the obtained third voice data to the voice recognition model updated in operation 607 at operation 609.

Figure 7:
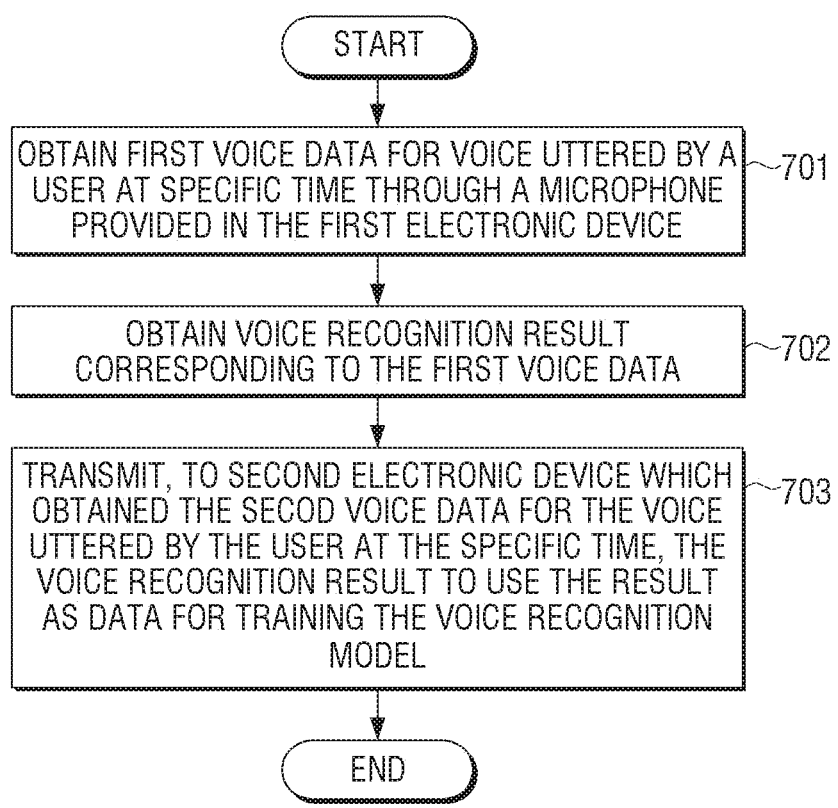
FIG. 7 is a flowchart of a first electronic device according to an embodiment of the disclosure.

FIG. 7 is a flowchart of a first electronic device according to an embodiment of the disclosure.

Referring to FIG. 7, the first electronic device 10 may be capable of communicating with the second electronic device 20. In this case, the first electronic device 10 may exist in a situation in which the user's voice is relatively well recognized compared to the second electronic device 20. For example, the first electronic device 10 may be an electronic device located at a first distance from the user, and the second electronic device 20 may be located at a second distance relatively farther than the first distance. Alternatively, the ambient noise at the first electronic device 10 may be lower than the ambient noise at the second electronic device 20. Alternatively, the performance of the microphone of the first electronic device 10 may be higher than that of the microphone of the second electronic device 20.

In this situation, the first electronic device 10 may obtain first voice data regarding voice uttered by the user at a specific time through a microphone provided in the first electronic device at operation 701. In this case, when the voice uttered by the user is detected, the first electronic device 10 may transmit a wakeup command to the second electronic device 20 to control the second electronic device 20 to obtain the second voice data.

In one embodiment, the first electronic device 10 may transmit the first voice data obtained by the first electronic device 10 to the second electronic device 20. The second electronic device 20 may obtain predicted voice data to be used for the data for training by correcting the third voice data obtained by the second electronic device 20 using the received first voice data. For example, the third voice data may be third voice data for the voice uttered by the user and other users. In this case, the second electronic device 20, by using the first voice data, may obtain from the third voice data the predicted voice data for the user's voice which is expected to be obtained when the voice uttered by the user 1 is received through the microphone in the second electronic device 20.

The first electronic device 10 may obtain the voice recognition result corresponding to the obtained first voice data at operation 702. The voice recognition result may include at least one of, for example, text data, user's intention, and path rule.

The first electronic device 10 may transmit, to the second electronic device 20 which obtained the second voice data for the voice uttered by the user at the specific time, the voice recognition result to be used as the data for training the voice recognition model at operation 703. For example, the first electronic device 10 may transmit the voice recognition result to be used as the data for learning to train at least one of an acoustic model and a language model included in the voice recognition model. At this time, the first electronic device 10 may further transmit the time information related to the voice to the second electronic device 20 along with the voice recognition result.

Figure 8:
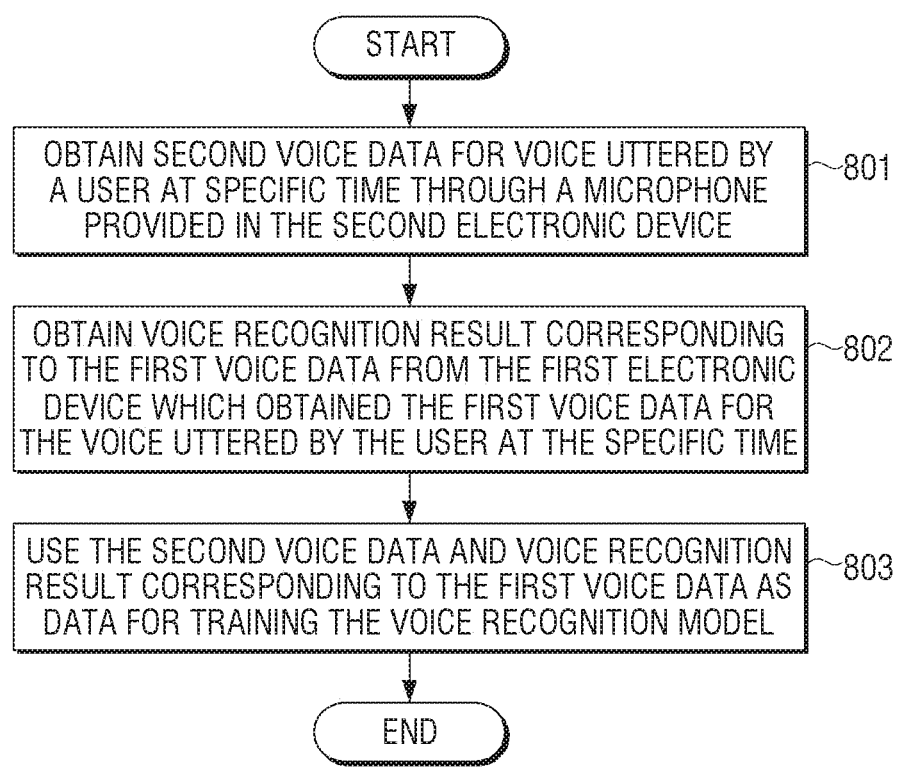
FIG. 8 is a flowchart of a second electronic device according to an embodiment of the disclosure.

FIG. 8 is a flowchart of a second electronic device according to an embodiment of the disclosure.

Referring to FIG. 8, the second electronic device 20 may be capable of communicating with the first electronic device 10. In this case, the second electronic device 20 may exist in a situation where it is relatively difficult to recognize the user's voice in comparison with the first electronic device 10. For example, the second electronic device 20 may be located at a second distance from the user, and the first electronic device 10 may be an electronic device 20 located at a first distance relatively closer to the user than the second distance. Alternatively, the ambient noise at the second electronic device 20 may be higher than the ambient noise at the first electronic device 10. Alternatively, the performance of the microphone of the second electronic device 20 may be lower than that of the microphone of the first electronic device 10.

In this situation, the second electronic device 20 may obtain second voice data regarding the voice uttered by the user at a specific time through the microphone provided in the second electronic device 20 at operation 801. For example, the second electronic device 20 may receive a wake-up command for obtaining the second voice data from the first electronic device 10. In response to the wake-up command, the second electronic device 20 may obtain second voice data regarding the voice uttered by the user at a specific time through the microphone provided in the second electronic device 20.

The second electronic device 20 may obtain the voice recognition result corresponding to the first voice data from the first electronic device which obtained the first voice data for the voice uttered by the user at the specific time at operation 802.

The second electronic device 20 may use the second voice data obtained in operation 801, and the voice recognition result corresponding to the first voice data obtained in operation 802 as data for training the voice recognition model at operation 803.

As an embodiment, the second electronic device 20 may receive time information related to the voice from the first electronic device 10 together with the voice recognition result. In this case, the second electronic device 20 may correct the obtained second voice data using time information related to the voice. The second electronic device 20 may use the corrected second voice data and a voice recognition result corresponding to the first voice data obtained in operation 802 as data for training the voice recognition model.

In an embodiment, the second electronic device 20 may obtain third voice data regarding the voice newly uttered by the user at a time different from the specific time when the user utters the voice in operation 801. The second electronic device 20 may apply the obtained third voice data to the updated voice recognition model using the data for training in operation 803. As a result of the application, the second electronic device 20 may obtain a voice recognition result corresponding to the third voice data.

In an embodiment, the second electronic device 20 may obtain third voice data about a voice uttered by the user and another user. In this case, the second electronic device 20, using the first voice data, may obtain the predicted voice data regarding the user's voice which is expected to be obtained when the voice uttered by the user 1 is received through the microphone by the second electronic device 20, from the third voice data. The second electronic device 20 may use the obtained predicted voice data and the voice recognition result corresponding to the first voice data as the data for training the voice recognition model.

Figure 9:
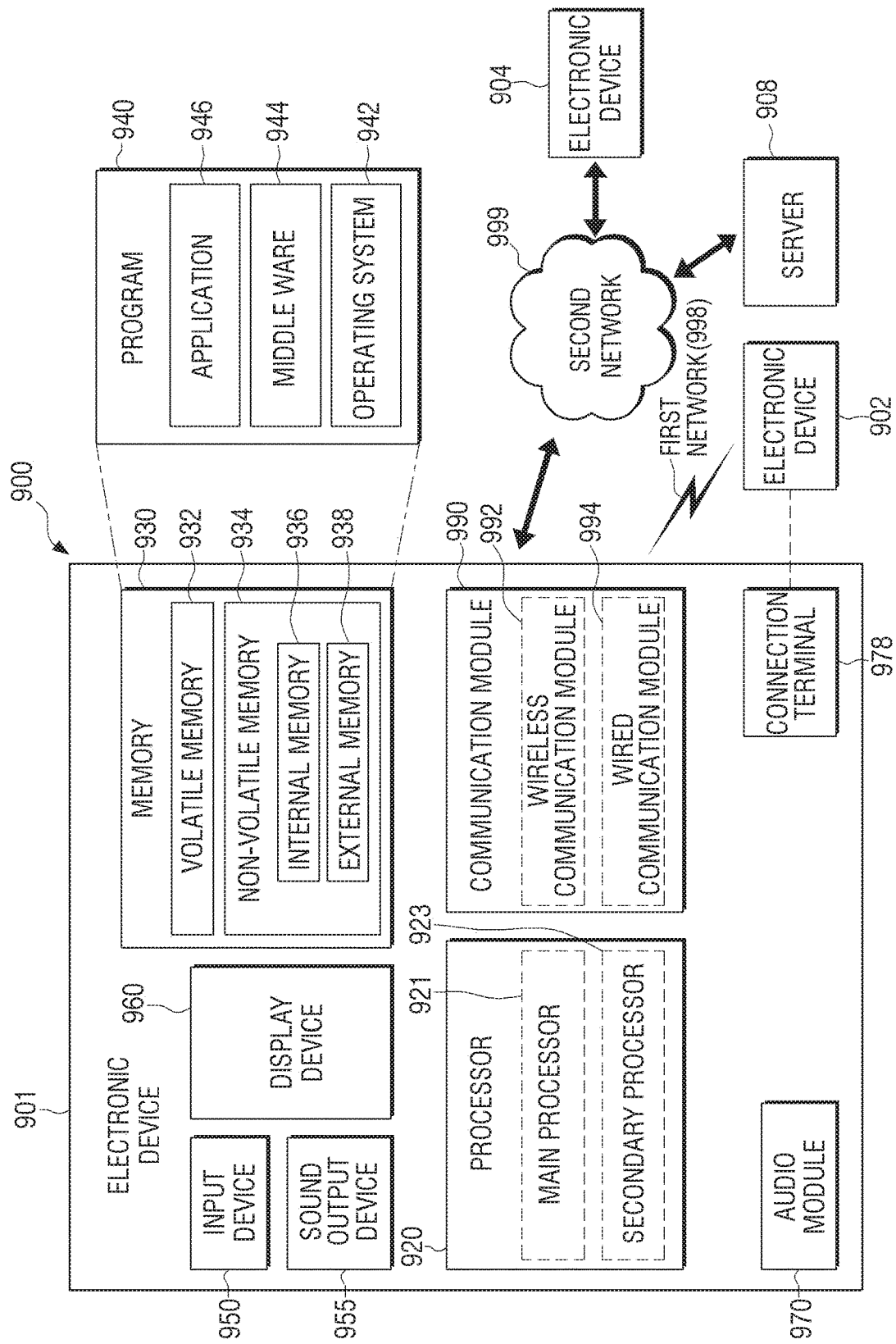
FIG. 9 is a detailed block diagram of an electronic device in a network environment according to an embodiment of the disclosure.

FIG. 9 is a detailed block diagram of an electronic device in a network environment according to an embodiment of the disclosure.

Referring to FIG. 9, an electronic device 901 may be any one of the first electronic device 10, the second electronic device 20, and the third electronic device 30 described in FIGS. 1A, 1B, 2, and 3.

Referring to FIG. 9, in a network environment 900, the electronic device 901 may communicate with an electronic device 902 through a first network 998 (e.g., a near field range wireless communication network), or communicate with an electronic device 904 or a server 908 through a second network 999 (e.g., long distance wireless communication network). According to an embodiment, the electronic device 901 may communicate with the electronic device 904 through the server 908. According to an embodiment, the electronic device 901 may include a processor 920, a memory 930, an input device 950, a sound output device 955, a display device 960, an audio module 970, and a communication module 990. In some embodiments, at least one of the components (e.g., the display device 960) may be omitted or one or more other components may be added to the electronic device 901. In some embodiments, some of these components may be implemented in one integrated circuit.

The processor 920 may control the at least one another component (e.g., hardware or software component) of the electronic device 901 connected to the processor 920 by executing the software (e.g., the program 940) and perform various data processing or operation. According to an embodiment, as at least a part of the data processing or operation, the processor 920 may load the command or data received from another component (e.g., the communication module 990) to a volatile memory 932, process command or data stored in the volatile memory 932, and store the result data in a non-volatile memory 934. According to one embodiment, the processor 920 may include a main processor 921 (e.g., a central processing unit or an application processor), and a secondary processor 923 (e.g., a graphics processing unit, an image signal processor, a sensor hub processor, or a communication processor) which may be operated together or independently. Additionally or alternatively, the secondary processor 923 may use less power than the main processor 921, or may be set to be specialized to a designated function. The secondary processor 923 may be implemented separately from, or as a part of, the main processor 921.

The secondary processor 923 may, for example, in place of the main processor 921 while the main processor 921 is in an inactive state (e.g., sleep) or along with the main processor 921 while the main processor 921 is in an active state (e.g., execution of an application) control a part of the functions or states related to at least one component (e.g., display device 960, the communication module 990) among the components of the electronic device 901. According to one embodiment, the secondary processor 923 (e.g., an image signal processor or a communication processor) may be implemented as a part of a functionally related other components (e.g., communication module 990). According to an embodiment, the secondary processor 923, when a wake-up command is received from an external device, may convert the main processor 921 to an active state.

The memory 930 may store various data used by at least one component (e.g., processor 920) of the electronic device 901. The data may include, for example, software (e.g., program 940) and input data or output data related with software instructions. The memory 930 may include the volatile memory 932 or non-volatile memory 934.

The program 940 may be stored in the memory 930 as software, and include, for example, an operating system 942, middleware 944, or an application 946.

The input device 950 may receive a command or data to be used for the components (e.g., processor 920) of the electronic device 901 from the outside (e.g., user) of the electronic device 901. The input device 950 may include, for example, a microphone, a mouse, a keyboard, or a digital pen (e.g., a stylus pen).

The sound output device 955 may output a sound signal to the outside of the electronic device 901. The sound output device 955 may include, for example, a speaker or a receiver. The speaker may be used for general purposes, such as multimedia playback or recording playback, and the receiver may be used to receive incoming calls. According to one embodiment, the receiver may be implemented separately from, or as a part of, the speaker.

The display device 960 may visually provide information to an outside (e.g., user) of the electronic device 901. The display device 960 may include, for example, a display, a hologram device, a projector, or a control circuit for controlling the device. According to an embodiment, the display device 960 may include a touch circuitry which is set to detect a touch or a sensor circuit (e.g., a pressure sensor) which is set to measure intensity of power generated by the touch.

The audio module 970 (e.g.: microphone) may convert sound into an electric signal, or convert an electric signal to sound, conversely. According to one embodiment, the audio module 970 may acquire sound through an input device 950, or output sound through the sound output device 955, or an external electronic device (e.g., electronic device 902) (e.g., speaker or headphone) which is directly or wirelessly connected to the electronic device 901.

A connection terminal 978 may include a connector through which the electronic device 901 may be physically connected to an external electronic device (e.g., the electronic device 902). According to an embodiment, the connection terminal 978 may include, for example, a high definition multimedia interface (HDMI) connector, a universal serial bus (USB) connector, a secure digital (SD) card connector, or an audio connector (e.g., a headphone connector).

The communication module 990 may support establishment of direct (e.g.: wired) communication channel between the electronic device 901 and an external electronic device (e.g., electronic device 902, electronic device 904, or server 908) or wireless communication channel, and communication through the established communication channels. The communication module 990 may include one or more communication processors which are operated independently of the processor 920 (e.g., application processor) and support direct (e.g., wired) communication or wireless communication. According to an embodiment, the communication module 990 may include a wireless communication module 992 (e.g., cellular communication module, near field wireless communication module, or global navigation satellite system (GNSS) communication module) or wired communication module 994 (e.g., local area network (LAN) communication module, or power line communication module). The corresponding communication module among these communication modules may communicate with an external electronic device via the first network 998 (e.g., Bluetooth, Wi-Fi direct or near field communication network such as infrared data association (IrDA)) or the second network 999 (e.g., telecommunication network such as cellular network, Internet, or computer network (e.g., LAN or WAN)). These types of communication modules may be incorporated into one component (e.g., a single chip) or implemented with a plurality of components (e.g., a plurality of chips) that are separate from each other.

At least a part of the components may be interconnected through the communication method (e.g., bus, general purpose input and output (GPIO), serial peripheral interface (SPI), or mobile industry processor interface (MIPI)) among peripheral devices and exchange a signal (e.g., command or data) from each other.

According to one embodiment, the command or data may be transmitted or received between the electronic device 901 and the external electronic device 904 via the server 908 connected to the second network 999. Each of the electronic devices 902 and 904 may be devices which are the same or different types from the electronic device 901. According to an embodiment, whole or a part of the operations executed by the electronic device 901 may be executed by one or more external devices among the external electronic devices 902, 904, or 908. For example, when the electronic device 901 has to perform a function or service automatically, or in response to a request from a user or another device, the electronic device 901 may request one or more external electronic devices to perform at least a part of the function or the service instead of, or in addition to, performing the function or service by itself. The one or more external electronic devices that have received the request may execute at least a portion of the requested function or service, or an additional function or service associated with the request, and transmit the result of the execution to the electronic device 901. The electronic device 901 may process the result as is or additionally, and provide the result as at least a portion of the response to the request. For this purpose, for example, cloud computing, distributed computing, or client-server computing technology may be used.

FIG. 10 is a view illustrating a system in a situation where there is a plurality of speakers according to an embodiment of the disclosure.

Referring to FIG. 10, the first electronic device 10, the second electronic device 20, the third electronic device 30, the first server 50, and the second server 60 of FIG. 10 respectively correspond to the first electronic device 10, the second electronic device 20, the third electronic device 30, the first server 50, and the second server 60 of FIGS. 1A, and 1B, and the redundant description will be omitted.

Referring to FIG. 10, the first user 1, a second user 4, and a third user 7 are illustrated. In this case, the first user 1 may be disposed to be closer to the first electronic device 10, and the second user 4 may be disposed to be closer to the second electronic device 20, and the third user may be disposed to be closer to the third electronic device 30.

In this case, the first user 1, the second user 4, and the third user 7 may utter voice together at a specific time (e.g., at a specific time or during the specific time). For example, at the specific time, the user 1 may utter the voice 2 "what time is it now?", the second user 4 may utter the voice 5 "the weather is good," and the third user 7 may utter voice 8, "I'm hungry."

Figure 11A:
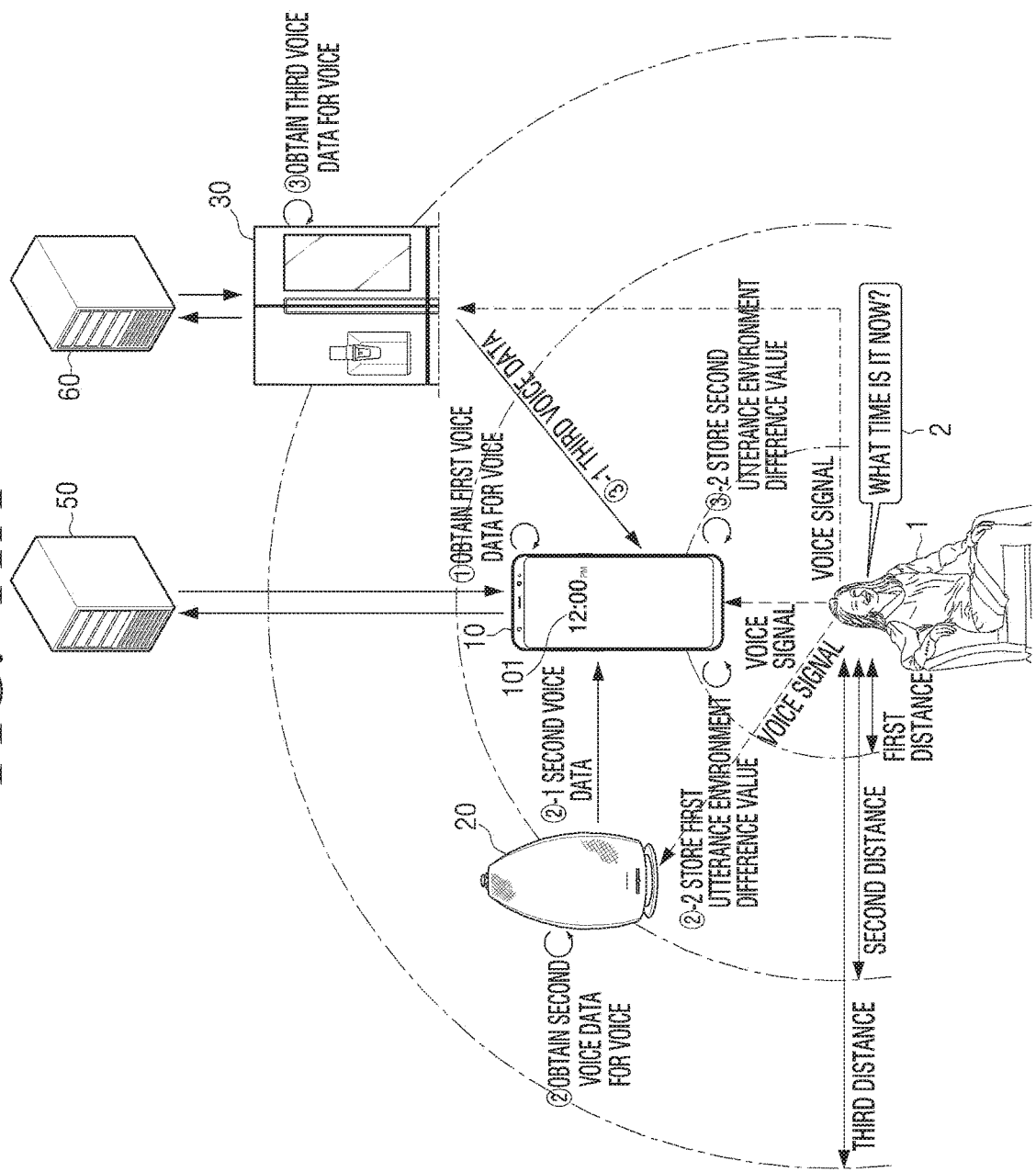
FIGS. 11A and 11B are views of a system considering an utterance environment according to an embodiment of the disclosure.
Figure 11B:
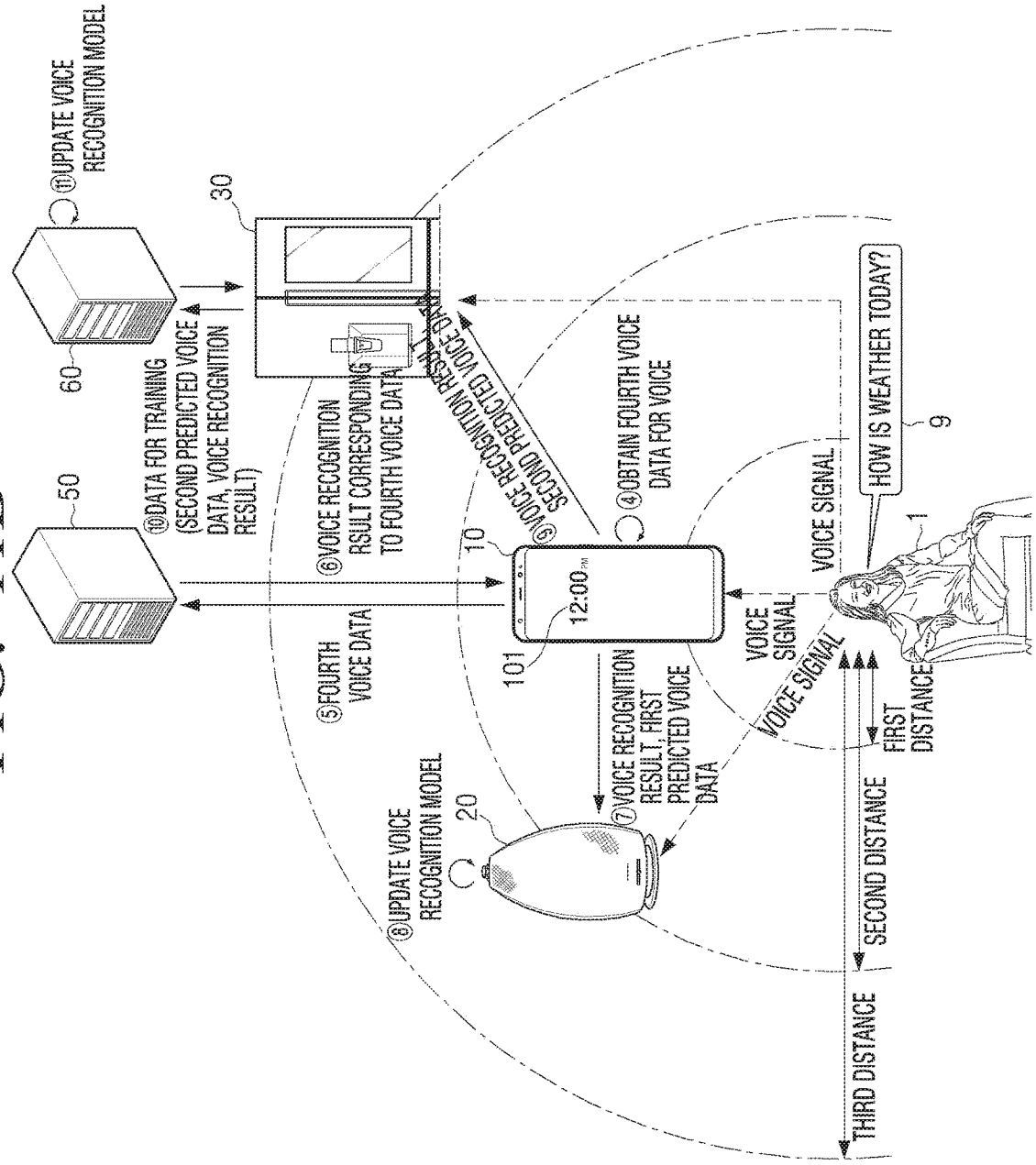

In this case, the microphones of each of the first electronic device 10, the second electronic device 20, and the third electronic device 30 may receive the voice signals uttered by each of the first user 1, the second user 4, and the third user 7, or receive the voice signal uttered by another user together. In the embodiment of FIGS. 11A and 11B, it is assumed that the microphone of the first electronic device 10 receives the voice signal uttered by the first user 1, the microphone of the second electronic device 20 receives the voice signal uttered by the first user 1 and the second user 4, and the microphone of the third electronic device 30 receives the voice signal uttered by the first user 1 and the third user 7.

In the above situation, the first electronic device 10 located at a first distance (e.g., short distance) from the first user 1 may obtain the first voice data for the voice 2 uttered by the first user 1 at the specific time through the microphone provided in the first electronic device 10 (①). At this time, the second electronic device 20 located at the second distance (e.g., middle distance) from the first user 1 may obtain the second voice data in which not only the voice 2 uttered by the first user 1 at the specific time through the microphone provided in the second electronic device 20 but also voice 5 uttered by the second user 4 located closer to the second electronic device 20 at the specific time are included (②). In addition, the third electronic device 30 positioned at the third distance (e.g., long distance) from the user 1 may obtain third voice data in which not only the voice 2 uttered by the first user 1 at the specific time through the microphone provided in the third electronic device 30 but also voice 8 uttered by a third user 7 located closer to the third electronic device 30 at the specific time (③).

In FIG. 10, when the first electronic device 10 obtains the first voice data, the first electronic device 10 may obtain the voice recognition result corresponding to the obtained first voice data. For example, the first electronic device 10 may apply the obtained first voice data to the voice recognition model provided in the first electronic device and obtain the voice recognition result. Alternatively, the first electronic device 10 may transmit the first voice data to the first server 50 which may communicate with the first electronic device 10 ((4)). The first electronic device 10 may obtain the voice recognition result corresponding to the first voice data from the first server 50 ((5)). At this time, the voice recognition result corresponding to the first voice data may mean the voice recognition result corresponding to the voice uttered by the first user. The various methods with which the first electronic device 10 obtains the voice recognition result from the first server 50 have been described in FIG. 1A and the redundant description will be omitted.

When the voice recognition result is obtained, the first electronic device 10 may transmit the voice recognition result corresponding to the voice 2 uttered by the first user 1, and the first voice data regarding the voice 2 uttered by the first user 1 to the second electronic device 20 ((6)). In addition, the first electronic device 10 may transmit the voice recognition result corresponding to the voice 2 uttered by the first user 1 and the first voice data regarding the voice 2 uttered by the first user to the third electronic device 30 ((7)). In an embodiment, each of the voice recognition results corresponding to the voice 2 uttered by the first user 1 and the first voice data for the voice 2 uttered by the first user 1 may be transmitted to the second electronic device 20 or the third electronic device 30 with a time difference, respectively. For example, after the voice recognition result corresponding to the voice 2 uttered by the first user 1 is transmitted, the first voice data regarding the voice 2 uttered by the first user 1 may be transmitted, and after the first voice data for the voice 2 uttered by the first user 1 is transmitted, the voice recognition result corresponding to the voice 2 uttered by the first user 1 may be transmitted.

The second electronic device 20 may use the voice recognition result corresponding to the voice 2 uttered by the first user 1 as a part of the data for training. For this purpose, the second electronic device 20 may, by using the first voice data for the voice 2 uttered by the first user 1 uttered by the first electronic device 10 in operation (6), extract the predicted voice data for the voice of the first user 1 from the second voice data in which the voice 2 uttered by the first user 1 obtained by the second electronic device 20 in operation (2) and the voice 5 uttered by the second user 4 are combined. The predicted voice data may be the voice data for the voice 2 uttered by the first user 1, from among the second voice data obtained through the microphone of the second electronic device 20.

To be specific, the first voice data for the voice 2 uttered by the first user 1, obtained by the first electronic device 10, may be represented as A, and the second voice data, obtained by the second electronic device 20, in which the voice 5 uttered by the first user 1 and the second user 4 are combined, may be represented as A'+B'.

At this time, the second voice data–the first voice data= (A'+B')−A=B'+residual A. Here, the second voice data− (second voice data−first voice data)=(A'+B')−(B'+residual A)=A'−residual A. Accordingly, A', which is voice data of the voice uttered by the first user 1 obtained by the second electronic device 20, may be a value in which the residual A is added to the first voice data obtained from the first electronic device 10 by the second electronic device 20.

The residual A may be a value of the utterance environment difference between the first electronic device 10 and the second electronic device 20. For example, the residual A may be a difference value between the first voice data A for the first user 1 obtained by the first electronic device 10 in a situation where only the first user 1 utters, and the second voice data A' for the first user 1 obtained by the second electronic device 2. Alternatively, in the non-utterance section, the residual A may be a difference value of the data for the environment signal obtained by the microphone provided in the first electronic device 10 and the data for the environment signal obtained by the microphone provided in the second electronic device 20.

Through the above-described process, when the predicted voice data A' is obtained, the second electronic device 20 may form the predicted voice data and the voice recognition result corresponding to the first voice data received in operation (6) into a set, and use it as data for training. For example, when the voice recognition model is located in the second electronic device 20, the second electronic device 20 may apply the {the predicted voice data generated in the second electronic device 20 and the voice recognition result obtained by the first electronic device 10} to the voice recognition model as the data for training, and update the voice recognition model positioned in the second electronic device 20 ((8)).

In addition, the third electronic device 30 may use the voice recognition result corresponding to the voice 2 uttered by the first user 1 as part of the data for training. For this purpose, the third electronic device 30, by using the first voice data for the voice 2 uttered by the first user 1 obtained by the first electronic device 10 in operation (7), may extract the predicted voice data for the voice of the first user 1 from the third voice data in which the voice 8 uttered by the first user 1 and the third user 7 obtained by the third electronic device 30 in operation (3) are combined. The predicted voice data may be the voice data for the voice 2 uttered by the first user 1 from among the third voice data obtained through the microphone of the third electronic device 30. A method for extracting the predicted voice data has been described with respect to the second electronic device 20 and will not be further described.

The third electronic device 30 may form the predicted voice data and the voice recognition result corresponding to the first voice data received in operation (7) into a set and use it as data for training. For example, when the voice recognition model is positioned at the second server 60, the third electronic device 30 may transmit {predicted voice data generated by the third electronic device 30, voice recognition result obtained by the first electronic device 10} as the data for training to the second server 60 in which the voice recognition model is positioned ((9)). The second server 60 may apply the received data for training to the voice recognition model and update the voice recognition model stored in the second server 60 ((10)).

FIGS. 11A and 11B are views of a system considering an utterance environment according to an embodiment of the disclosure.

The first electronic device 10, the second electronic device 20, the third electronic device 30, the first server 50, and the second server 60 of FIG. 11A correspond to the first electronic device 10, the second electronic device 20, the third electronic device 30, the first server 50, and the second server 60 of FIGS. 1A and 1B, respectively, and the redundant description will be omitted.

Referring to FIG. 11A, when the user 1 utters the voice 2, the first electronic device 10 may obtain the first voice data for the voice 2 uttered by the user 1 at the specific time through h the microphone provided in the first electronic device 10 ((1)).

At this time, the second electronic device 20 positioned at the second distance (e.g., middle distance) from the user 1 may obtain the second voice data for the voice 2 uttered by the user 1 at the specific time through the microphone provided in the second electronic device 20 ((2)).

The second electronic device 20 may transmit the second voice data for the voice 2 uttered by the user 1 to the first electronic device 10 (②-1).

The first electronic device 10, using the second voice data obtained from the second electronic device 20, may obtain and store the first utterance environment difference between the first electronic device 10 and the second electronic device 20 (②-2).

To be specific, the first voice data for the voice 2 uttered by the user 1 obtained by the first electronic device 10 may be represented as A, and the second voice data for the voice 2 uttered by the user 1 obtained by the second electronic device 20 may be represented as A'. At this time, the second voice data−first voice data=A−A'=residual A. The residual A may be stored as the first utterance environment difference value between the first electronic device 10 and the second electronic device 20.

In addition, the third electronic device 30 positioned at the third distance (e.g., long distance) from the user 1 also may obtain the third voice data for the voice 2 uttered by the user 1 at the specific time through the microphone provided in the third electronic device 30 (③).

The third electronic device 30 may transmit the third voice data for the voice 2 uttered by the user 1 to the first electronic device 10 (③-1).

The first electronic device 10, using the third voice data obtained from the third electronic device 30, may obtain and store the second utterance environment difference value between the first electronic device 10 and the third electronic device 30 (③-2).

Referring to FIG. 11B, the user 1 may utter a voice 9 at a time different from the specific time at which the voice 2 is uttered. The first electronic device 10 may obtain fourth voice data of the voice 9 uttered by the user 1 through the provided microphone (④). The first electronic device 10 may obtain a voice recognition result corresponding to the obtained fourth voice data. For example, the first electronic device 10 may obtain a voice recognition result by applying a voice recognition result corresponding to the obtained fourth voice data to a voice recognition model provided in the first electronic device 10. Alternatively, the first electronic device 10 may transmit the fourth voice data to the first server 50 capable of communicating with the first electronic device 10 (⑤). The first electronic device 10 may obtain a voice recognition result corresponding to the fourth voice data from the first server 50 (⑥).

In the meantime, the first electronic device 10, by using the obtained fourth voice data and the first utterance environment difference value stored in the operation ((②-2), may generate the first predicted voice data which is expected to be obtained, when the user receives the voice 9 uttered by the user 1 through the microphone in the second electronic device 20. For example, the first electronic device 10 may generate first predicted voice data by adding the obtained fourth voice data and the first voice environment difference value. The first electronic device 10 may transmit a voice recognition result corresponding to the first predicted voice data and the fourth voice data acquired in operation ⑥ to the second electronic device 20 (⑦). The second electronic device 20 may update the voice recognition model by applying {the first predicted voice data generated in the first electronic device 10 and the voice recognition result obtained from the first electronic device 10} as the data for training to the voice recognition model (⑧).

In addition, the first electronic device 10, by using the obtained fourth voice data and the second utterance environment difference value stored in the operation (③-2), may generate second predicted voice data which is expected to be obtained when the voice 9 uttered by the user 1 is received via the microphone. For example, the first electronic device 10 may generate second predicted voice data by adding the obtained fourth voice data and the second voice environment difference value. The first electronic device 10 may transmit a voice recognition result corresponding to the second predicted voice data and the fourth voice data obtained in operation ⑥ to the third electronic device 30 (⑨). The third electronic device 30 may form {the second predicted voice data generated by the first electronic device 10, the voice recognition result obtained from the first electronic device 10} into a set, and use the data as data for learning. For example, when the voice recognition model is located in the second server 60, the third electronic device 30 may transmit {the second predicted voice data generated in the first electronic device 10 and the voice recognition result obtained from the first electronic device 10} as data for training to the second server 60 in which the voice recognition model is located (⑩). The second server 60, by applying the received data for training to the voice recognition model, may update the voice recognition model stored in the second server 60 (⑪).

In one embodiment, the first electronic device 10 may transmit {the second predicted voice data generated in the first electronic device 10 and the voice recognition result obtained by the first electronic device 10} directly to the second server 60, without passing through the third electronic device 30. The second server 60 may apply the received data for training to the voice recognition model and update the voice recognition model stored in the second server 60.

In one embodiment, the above-described utterance environment difference value may be measured even in a situation where the user 1 does not utter a voice. For example, after purchasing the first electronic device 10, the second electronic device 20, and the third electronic device 30, the user may activate the microphones of the electronic devices for a predetermined time. In this case, based on the difference value of the data in the environmental signal received by the microphones of the above-described electronic devices, the utterance environment difference value for generating the predicted voice data may be obtained.

The term "module" used in the disclosure may include units consisting of hardware, software, or firmware, and is used interchangeably with terms such as, for example, logic, logic blocks, parts, or circuits. A "module" may be an integrally constructed component or a minimum unit or part thereof that performs one or more functions. For example, according to an embodiment, the module may be configured as an application-specific integrated circuit (ASIC).

Meanwhile, various embodiments of the disclosure may be implemented in software (e.g., program 940), including instructions stored on machine-readable storage media (e.g., memory 440, internal memory 936 or external memory 938) readable by a machine (e.g., first electronic device 10, second electronic device 20, third electronic device 30, electronic device 901). For example, a processor (e.g., processor 410, processor 920) of a device (e.g., first electronic device 10, second electronic device 20, third electronic device 30) may call at least one instruction from among one or more instructions stored in the storage medium, and execute the called instruction. This enables that the apparatus to be operated to perform at least one instruction according to the at least one called instruction. The one or more instructions may include a code generated by a compiler or a code executable by an interpreter. A machine-readable storage medium may be provided in the form of a non-transitory storage medium. Herein, the term "non-transitory" only denotes that a storage medium does not include a signal (e.g., an electromagnetic wave) but is tangible, and does not distinguish the case in which a data is semi-permanently stored in a storage medium from the case in which a data is temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server Each of the elements (for example, a module or a program) according to various embodiments may be composed of a single entity or a plurality of entities, and some sub-elements of the abovementioned sub-elements may be omitted. The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for providing data for training by a first electronic device, the method comprising:
   obtaining first voice data for a voice uttered by a user through the first electronic device;
   obtaining a first voice recognition result comprising a first text, the first text corresponding to the first voice data by inputting the first voice data to a first voice recognition model; and
   transmitting the first voice recognition result, to a second electronic device which obtained second voice data for the voice uttered by the user,
   wherein the first voice recognition result is used to train a second voice recognition model for obtaining a second voice recognition result comprising a second text, the second text corresponding to the second voice data, and
   wherein a performance of the second electronic device is lower than a performance of the first electronic device.

2. The method for providing data for training of claim 1, the method comprising:
   based on the voice uttered by the user being sensed, transmitting, to the second electronic device, a wake-up command to control the second electronic device to obtain the second voice data for the voice.

3. The method for providing data for training of claim 1, further comprising:
   transmitting the obtained first voice data to the second electronic device.

4. The method for providing data for training of claim 1, wherein the first electronic device is positioned at a first distance from the user, and the second electronic device is positioned at a second distance, which is a greater distance than the first distance.

5. The method for providing data for training of claim 1, wherein an ambient noise at the second electronic device is higher than an ambient noise at the first electronic device.

6. A method for obtaining data for training by a second electronic device, the method comprising:
   obtaining second voice data for a voice uttered by a user through the second electronic device;
   receiving a first voice recognition result comprising a first text, the first text corresponding to first voice data from a first electronic device which obtained the first voice data for the voice uttered by the user, wherein the first voice recognition result is obtained through a first voice recognition model; and
   using the second voice data and the first voice recognition result corresponding to the first voice data, to train a second voice recognition model for obtaining a second voice recognition result comprising a second text, the second text corresponding to the second voice data,
   wherein a performance of the second electronic device is lower than a performance of the first electronic device.

7. The method for obtaining data for training of claim 6, further comprising:
   receiving, from the first electronic device, a wake-up command to obtain the second voice data,
   wherein the obtaining of the second voice data comprises, in response to the wake-up command, obtaining the second voice data for the voice uttered by the user through the second electronic device.

8. The method for obtaining data for training of claim 6, further comprising:
   receiving, from the first electronic device, time information related to the voice; and
   correcting the obtained second voice data using the time information related to the voice,
   wherein using the second voice data and the first voice recognition result corresponding to the first voice data, as the data for training the second voice recognition model comprises using the corrected second voice data and the first voice recognition result corresponding to the first voice data, as the data for training the second voice recognition model.

9. The method for obtaining data for training of claim 6, further comprising:
   obtaining third voice data for a voice uttered by the user;
   applying the obtained third voice data to the second voice recognition model updated using the data for training the second voice recognition model; and
   based on the applying of the obtained third voice data to the second voice recognition model updated using the data for training the second voice recognition model, obtaining a first voice recognition result corresponding to the third voice data.

10. The method for obtaining data for training of claim 6, further comprising:
    obtaining third voice data for a voice uttered by the user and another user;
    obtaining the first voice data from the first electronic device;

using the first voice data, obtaining predicted voice data for the voice uttered by the user from the third voice data; and using the predicted voice data and the first voice recognition result corresponding to the first voice data, as additional data for training the second voice recognition model.

11. A first electronic device comprising:
a communicator configured to communicate with a second electronic device;
at least one processor configured to execute at least one instruction; and
a memory configured to store the at least one instruction,
wherein the at least one processor, based on the at least one instruction being executed, is configured to:
  obtain first voice data for the voice uttered by a user,
  obtain a first voice recognition result comprising a first text, the first text corresponding to the first voice data by inputting the first voice data to a first voice recognition model, and
  transmit the first voice recognition result, to the second electronic device which obtained a second voice data fort the voice uttered by the user,
  wherein the first voice recognition result is used to train a second voice recognition model for obtaining a second voice recognition result comprising a second text, the second text corresponding to the second voice data, and
wherein a performance of the second electronic device is lower than a performance of the first electronic device.

12. The first electronic device of claim 11, wherein the at least one processor, based on the at least one instruction being executed, is configured to, based on the voice uttered by the user being sensed, transmit, to the second electronic device, a wake-up command to control the second electronic device to obtain the second voice data for the voice.

13. The first electronic device of claim 11, wherein the at least one processor, based on the at least one instruction being executed, is configured to transmit the obtained first voice data to the second electronic device.

14. The first electronic device of claim 11, wherein the first electronic device is positioned at a first distance from the user, and the second electronic device is positioned at a second distance, which is a greater distance than the first distance.

15. The first electronic device of claim 11, wherein an ambient noise at the second electronic device is higher than an ambient noise at the first electronic device.

16. A second electronic device comprising:
a communicator configured to communicate with a first electronic device;
at least one processor configured to execute at least one instruction; and
a memory configured to store the at least one instruction,
wherein the at least one processor, based on the at least one instruction being executed, is configured to:
  obtain second voice data for the voice uttered by a user,
  receive, from the first electronic device which obtained first voice data for the voice uttered by the user, a first voice recognition result comprising a first text, the first text corresponding to the first voice data through the communicator, wherein the first voice recognition result is obtained through a first voice recognition model, and
  use the second voice data and the first voice recognition result corresponding to the first voice data, to train a second voice recognition model for obtaining a second voice recognition result comprising a second text, the second text corresponding to the second voice data, and
wherein a performance of the second electronic device is lower than a performance of the first electronic device.

17. The second electronic device of claim 16,
wherein the at least one processor, based on the at least one instruction being executed, is configured to:
  receive, from the first electronic device, a wake-up command to obtain the second voice data through the communicator, and
wherein the second voice data for the voice uttered by the user is obtained in response to the wake-up command.

18. The second electronic device of claim 16,
wherein the at least one processor, based on the at least one instruction being executed, is configured to:
  receive, from the first electronic device, time information related to the voice, and
  correct the obtained second voice data using the time information related to the voice, and
wherein the corrected second voice data and the first voice recognition result corresponding to the first voice data, are used as the data for training the second voice recognition model.

19. The method for providing data for training of claim 1, wherein a performance of a microphone of the second electronic device is lower than a performance of the microphone of the first electronic device.

20. The method for obtaining data for training of claim 6, wherein a performance of a microphone of the second electronic device is lower than a performance of the microphone of the first electronic device.

* * * * *